United States Patent
Sekino et al.

(10) Patent No.: US 6,998,194 B2
(45) Date of Patent: Feb. 14, 2006

(54) NONAQUEOUS ELECTROLYTE AND NONAQUEOUS ELECTROLYTE SECONDARY BATTERY

(75) Inventors: Masahiro Sekino, Kawasaki (JP); Asako Sato, Yokohama (JP); Jun Momma, Yokohama (JP); Masayuki Oguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 113 days.

(21) Appl. No.: 10/355,304

(22) Filed: Jan. 31, 2003

(65) Prior Publication Data

US 2003/0198871 A1     Oct. 23, 2003

Related U.S. Application Data

(63) Continuation of application No. PCT/JP02/11160, filed on Oct. 28, 2002.

(30) Foreign Application Priority Data

Oct. 26, 2001 (JP) .............................. 2001-329950

(51) Int. Cl.
 *H01M 6/16* (2006.01)
(52) U.S. Cl. ............... 429/331; 429/231.8; 429/300; 429/163
(58) Field of Classification Search ............... 429/331, 429/163, 231.8, 300
 See application file for complete search history.

(56) References Cited

U.S. PATENT DOCUMENTS

2002/0164531 A1 * 11/2002 Sekino et al. ............... 429/331

FOREIGN PATENT DOCUMENTS

| JP | 04-014769 | 1/1992 |
|---|---|---|
| JP | 07-085888 | 3/1995 |
| JP | 11-339851 | 12/1999 |
| JP | 2000-235868 | 8/2000 |
| JP | 2000-285925 | 10/2000 |
| JP | 2001-126761 | 5/2001 |
| JP | 2001-167797 | 6/2001 |
| JP | 2002-015771 | 1/2002 |
| JP | 2002-042865 | 2/2002 |
| JP | 2002-110232 | 4/2002 |
| JP | 2002-184462 | 6/2002 |
| JP | 2002-190316 | 7/2002 |
| JP | 2002-260726 | 9/2002 |
| JP | 2002-324580 | 11/2002 |

* cited by examiner

*Primary Examiner*—Laura Weiner
(74) *Attorney, Agent, or Firm*—Oblon, Spivak, McClelland, Maier & Neustadt, P.C.

(57) ABSTRACT

The present invention provide a nonaqueous electrolyte comprising a nonaqueous solvent, wherein the nonaqueous solvent includes ethylene carbonate (EC), propylene carbonate (PC), γ-butyrolactone (GBL) and a fourth component that is a solvent other than the EC, the PC and the GBL, and the nonaqueous solvent satisfies the following equations (1) to (4):

$$15 \leq x \leq 50 \quad (1)$$
$$30 \leq y \leq 75 \quad (2)$$
$$0 < z < 30 \quad (3)$$
$$0 < p \leq 5 \quad (4)$$

where, the x is a ratio (volume %) of ethylene carbonate to a total volume of the nonaqueous solvent, the y is a ratio (volume %) of propylene carbonate to the total volume of the nonaqueous solvent, the z is a ratio (volume %) of γ-butyrolactone to the total volume of the nonaqueous solvent, and the p is a ratio (volume %) of the fourth component to the total volume of the nonaqueous solvent.

18 Claims, 2 Drawing Sheets

NONAQUEOUS ELECTROLYTE AND NONAQUEOUS ELECTROLYTE SECONDARY BATTERY

CROSS-REFERENCE TO RELATED APPLICATIONS

This is a Continuation Application of PCT Application No. PCT/JP02/11160, filed Oct. 28, 2002, which was not published under PCT Article 21(2) in English.

This application is based upon and claims the benefit of priority from the prior Japanese Patent Applications No. 2001-329950, filed Oct. 26, 2001, the entire contents of which are incorporated herein by reference.

BACKGROUND OF THE INVENTION

1. Field of the Invention

The present invention relates to a nonaqueous electrolyte and a nonaqueous electrolyte secondary battery.

2. Description of the Related Art

At present, as nonaqueous electrolyte secondary batteries for use in portable devices such as portable telephones or the like, lithium ion secondary batteries are commercialized. As an example of the lithium ion secondary battery, one that includes a positive electrode containing a lithium cobalt composite oxide (for instance, $LiCoO_2$), a negative electrode containing a graphitized material or a carbonaceous material, a liquid nonaqueous electrolyte containing an organic solvent therein a lithium salt is dissolved, and a porous film that is a separator is known. As the organic solvent a nonaqueous solvent of low viscosity and low boiling point is used.

For instance, in Jpn. Pat. Appln. KOKAI Publication No. 4-14769, a nonaqueous electrolyte secondary battery comprising a liquid nonaqueous electrolyte that is mainly made of a solvent mixture in which propylene carbonate, ethylene carbonate and γ-butyrolactone are mixed, and has a ratio of γ-butyrolactone in the range of 10 to 50% by volume with respect to a total solvent mixture is described. In the publication, γ-butyrolactone is added to a solvent mixture of propylene carbonate and ethylene carbonate to increase the conductivity of the liquid nonaqueous electrolyte at low temperatures, and thereby low temperature discharge characteristics of a cylindrical nonaqueous electrolyte secondary battery are improved.

However, in the nonaqueous electrolyte secondary battery disclosed in Jpn. Pat. Appln. KOKAI Publication No. 4-14769, a lot of gas is generated from a negative electrode at the initial charge, or when stored at extremely high temperatures of 60° C. or more, the positive electrode reacts with the liquid nonaqueous electrolyte and an oxidative degradation of the liquid nonaqueous electrolyte is caused, and thereby a gas is generated. Accordingly, when in order to make a thickness of a battery thinner, a wall thickness of a case that accommodates the positive electrode, the negative electrode, the separator and the liquid nonaqueous electrolyte is made thinner, there occurs a problem in that the case swells owing to the generated gas, resulting in deforming. When the case is deformed, the battery may not be fitted into an electronic device, or malfunction of the electronic device may be caused. Furthermore, in the nonaqueous electrolyte secondary battery, there is a problem in that under a high temperature environment, a reaction between the negative electrode and γ-butyrolactone tends to proceed, accordingly a longer life in the charge-discharge cycle at high temperatures cannot be obtained.

BRIEF SUMMARY OF THE INVENTION

The present invention intends to provide a nonaqueous electrolyte that can improve a charge-discharge cycle life at high temperatures and a nonaqueous electrolyte secondary battery comprising the nonaqueous electrolyte.

According to first aspect of the present invention, there is provided a nonaqueous electrolyte that includes a nonaqueous solvent and an electrolyte which is dissolved in the nonaqueous solvent; wherein the nonaqueous solvent includes ethylene carbonate (EC), propylene carbonate (PC), γ-butyrolactone (GBL), and a fourth component that is a solvent other than the EC, the PC and the GBL, and the nonaqueous solvent satisfies the following equations (1) to (4):

$$15 \leq x \leq 50 \quad (1)$$
$$30 \leq y \leq 75 \quad (2)$$
$$0 < z < 30 \quad (3)$$
$$0 < p \leq 5 \quad (4)$$

where, the x is a ratio (volume %) of ethylene carbonate to a total volume of the nonaqueous solvent, the y is a ratio (volume %) of propylene carbonate to the total volume of the nonaqueous solvent, the z is a ratio (volume %) of γ-butyrolactone to the total volume of the nonaqueous solvent, and the p is a ratio (volume %) of the fourth component to the total volume of the nonaqueous solvent.

According to second aspect of the present invention, there is provided a nonaqueous electrolyte that includes a nonaqueous solvent and an electrolyte which is dissolved in the nonaqueous solvent; wherein the nonaqueous solvent includes ethylene carbonate (EC), propylene carbonate (PC), γ-butyrolactone (GBL), vinylene carbonate (VC), and a fifth component that is a solvent other than the EC, the PC, the GBL and the VC, and the nonaqueous solvent satisfies the following equations (5) to (9):

$$15 \leq x \leq 50 \quad (5)$$
$$30 \leq y \leq 75 \quad (6)$$
$$0 < z < 30 \quad (7)$$
$$0 < w \leq 5 \quad (8)$$
$$0 < q \leq 5 \quad (9)$$

where, the x is a ratio (volume %) of ethylene carbonate to a total volume of the nonaqueous solvent, the y is a ratio (volume %) of propylene carbonate to the total volume of the nonaqueous solvent, the z is a ratio (volume %) of γ-butyrolactone to the total volume of the nonaqueous solvent, the w is a ratio (volume %) of vinylene carbonate to the total volume of the nonaqueous solvent, and the q is a ratio (volume %) of the fifth component to the total volume of the nonaqueous solvent.

According to third aspect of the present invention, there is provided a nonaqueous electrolyte secondary battery comprises a case, an electrode group which is provided in the case, and a nonaqueous electrolyte which is provided in the case and contains a nonaqueous solvent, wherein the nonaqueous solvent includes ethylene carbonate (EC), propylene carbonate (PC), γ-butyrolactone (GBL), and a fourth component that is a solvent other than the EC, the PC and the GBL, and the nonaqueous solvent satisfies the following equations (1) to (4):

$$15 \leq x \leq 50 \quad (1)$$
$$30 \leq y \leq 75 \quad (2)$$
$$0 < z < 30 \quad (3)$$
$$0 < p \leq 5 \quad (4)$$

where, the x is a ratio (volume %) of ethylene carbonate to a total volume of the nonaqueous solvent, the y is a ratio (volume %) of propylene carbonate to the total volume of the nonaqueous solvent, the z is a ratio (volume %) of γ-butyrolactone to the total volume of the nonaqueous solvent, and the p is a ratio (volume %) of the fourth component to the total volume of the nonaqueous solvent.

According to fourth aspect of the present invention, there is provided a nonaqueous electrolyte secondary battery comprises a case, an electrode group which is provided in the case, and a nonaqueous electrolyte which is provided in the case and contains a nonaqueous solvent, wherein the nonaqueous solvent includes ethylene carbonate (EC), propylene carbonate (PC), γ-butyrolactone (GBL), vinylene carbonate (VC) and a fifth component that is a solvent other than the EC, the PC, the GBL and the VC, and the nonaqueous solvent satisfies the following equations (5) to (9):

$$15 \leq x \leq 50 \quad (5)$$
$$30 \leq y \leq 75 \quad (6)$$
$$0 < z < 30 \quad (7)$$
$$0 < w \leq 5 \quad (8)$$
$$0 < q \leq 5 \quad (9)$$

where, the x is a ratio (volume %) of ethylene carbonate to a total volume of the nonaqueous solvent, the y is a ratio (volume %) of propylene carbonate to the total volume of the nonaqueous solvent, the z is a ratio (volume %) of γ-butyrolactone to the total volume of the nonaqueous solvent, the w is a ratio (volume %) of vinylene carbonate to the total volume of the nonaqueous solvent, and the q is a ratio (volume %) of the fifth component to the total volume of the nonaqueous solvent.

According to fifth aspect of the present invention, there is provided a nonaqueous electrolyte secondary battery comprises a case; a positive electrode which is provided in the case; a negative electrode which is provided in the case; and an electrolyte layer which is arranged between the positive electrode and the negative electrode, and the electrolyte layer contains a liquid nonaqueous electrolyte and a polymer having a function of gelating the liquid nonaqueous electrolyte, wherein the liquid nonaqueous electrolyte contains a nonaqueous solvent that includes ethylene carbonate (EC), propylene carbonate (PC), γ-butyrolactone (GBL), and a fourth component that is a solvent other than the EC, the PC and the GBL, and the nonaqueous solvent satisfies the following equations (1) to (4):

$$15 \leq x \leq 50 \quad (1)$$
$$30 \leq y \leq 75 \quad (2)$$
$$0 < z < 30 \quad (3)$$
$$0 < p \leq 5 \quad (4)$$

where, the x is a ratio (volume %) of ethylene carbonate to a total volume of the nonaqueous solvent, the y is a ratio (volume %) of propylene carbonate to the total volume of the nonaqueous solvent, the z is a ratio (volume %) of γ-butyrolactone to the total volume of the nonaqueous solvent, and the p is a ratio (volume %) of the fourth component to the total volume of the nonaqueous solvent.

According to sixth aspect of the present invention, there is provided a nonaqueous electrolyte secondary battery comprises a case; a positive electrode which is provided in the case; a negative electrode which is provided in the case; and an electrolyte layer which is arranged between the positive electrode and the negative electrode, and the electrolyte layer contains a liquid nonaqueous electrolyte and a polymer having a function of gelating the liquid nonaqueous electrolyte, wherein the liquid nonaqueous electrolyte contains a nonaqueous solvent that includes ethylene carbonate (EC), propylene carbonate (PC), γ-butyrolactone (GBL), vinylene carbonate (VC) and a fifth component that is a solvent other than the EC, the PC, the GBL and the VC, and the nonaqueous solvent satisfies the following equations (5) to (9):

$$15 \leq x \leq 50 \quad (5)$$
$$30 \leq y \leq 75 \quad (6)$$
$$0 < z < 30 \quad (7)$$
$$0 < w \leq 5 \quad (8)$$
$$0 < q \leq 5 \quad (9)$$

where, the x is a ratio (volume %) of ethylene carbonate to a total volume of the nonaqueous solvent, the y is a ratio (volume %) of propylene carbonate to the total volume of the nonaqueous solvent, the z is a ratio (volume %) of γ-butyrolactone to the total volume of the nonaqueous solvent, the w is a ratio (volume %) of vinylene carbonate to the total volume of the nonaqueous solvent, and the q is a ratio (volume %) of the fifth component to the total volume of the nonaqueous solvent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Figure 1:
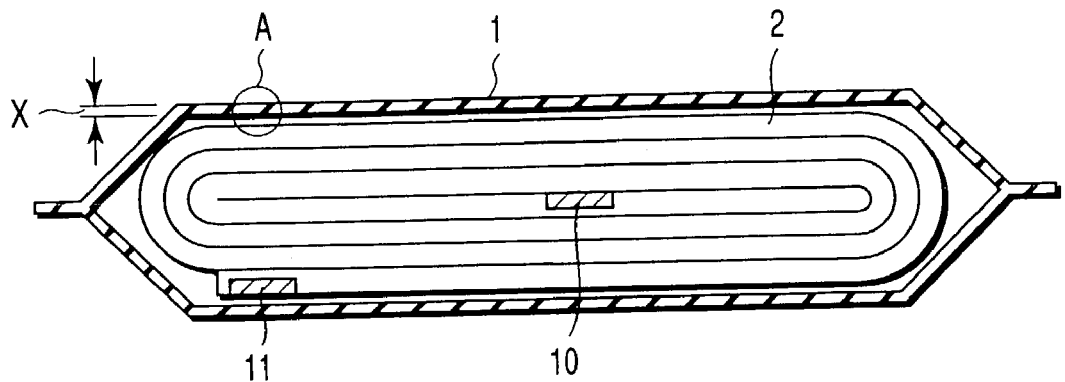
FIG. 1 is a sectional view showing a thin lithium ion secondary battery that is an example of a nonaqueous electrolyte secondary battery according to the present invention.

A nonaqueous electrolyte secondary battery according to the present invention includes a case, an electrode group which is accommodated in the case, and a nonaqueous electrolyte which is held by the electrode group and contains a nonaqueous solvent.

For the nonaqueous solvent, for instance, any one of (A) and (B) described in the following is used.

(A) Nonaqueous Solvent A

The nonaqueous solvent A includes ethylene carbonate (EC), propylene carbonate (PC), γ-butyrolactone (GBL), and a fourth component that is a solvent other than the EC, the PC and the GBL.

When ratios of volumes of ethylene carbonate, propylene carbonate, γ-butyrolactone and the fourth component relative to a total volume of the nonaqueous solvent, respectively, are x (volume %), y (volume %), z (volume %) and p (volume %), the x, the y, the z and the p, respectively, satisfy $15 \leq x \leq 50$, $30 \leq y \leq 75$, $0 < z < 30$ and $0 < p \leq 5$.

(B) Nonaqueous Solvent B

The nonaqueous solvent B includes ethylene carbonate (EC), propylene carbonate (PC), γ-butyrolactone (GBL), vinylene carbonate (VC) and a fifth component that is a solvent other than the EC, the PC, the GBL and the VC.

When ratios of volumes of ethylene carbonate, propylene carbonate, γ-butyrolactone, vinylene carbonate and the fifth component relative to a total volume of the nonaqueous solvent, respectively, are x (volume %), y (volume %), z (volume %), w (volume %) and q (volume %), the x, the y, the z, the w and the q, respectively, satisfy $15 \leq x \leq 50$, $30 \leq y \leq 75$, $0 < z < 30$, $0 < w \leq 5$, and $0 < q \leq 5$.

In the nonaqueous electrolytes, ones that are substantially in a liquid or gel form can be used. Among these, a liquid nonaqueous electrolyte is preferable. By use of the liquid nonaqueous electrolyte, ionic conductivity can be heightened. Accordingly, interfacial resistance between the positive electrode and the separator, and interfacial resistance between the negative electrode and the separator can be made smaller.

The nonaqueous electrolyte can be prepared according to methods explained, for instance, in the following (I) to (IV).

(I) An electrolyte (for instance, lithium salt) is dissolved in either one of the above nonaqueous solvent A or B, and thereby a liquid nonaqueous electrolyte is obtained.

(II) A paste prepared by mixing either one of the nonaqueous solvent A or B, an electrolyte and a polymer is coated and dried. The obtained thin film is interposed between the positive electrode and the negative electrode, and thereby an electrode group is obtained. After the electrode group is impregnated with a liquid nonaqueous electrolyte, the thin film is plasticized under a reduced pressure.

(III) After the separator is impregnated with a slurry containing either one of the nonaqueous solvent A or B, an electrolyte and a gelling agent, the separator is interposed between the positive electrode and the negative electrode, and thereby an electrode group containing a gel-like nonaqueous electrolyte is obtained.

(IV) A slurry containing either one of the nonaqueous solvent A or B, an electrolyte, and a gelling agent is coated on the positive electrode or the negative electrode, and a separator is interposed between the positive and negative electrodes, and thereby an electrode group containing a gel-like nonaqueous electrolyte is obtained.

As the gelling agent, for instance, polyacrylonitrile (PAN) can be cited.

In the following, specific examples of the secondary batteries according to the present invention (nonaqueous electrolyte secondary battery (I) and nonaqueous electrolyte secondary battery (II)) will be explained.

1. Nonaqueous Electrolyte Secondary Battery (I)

The nonaqueous electrolyte secondary battery includes a case having a thickness of 0.3 mm or less, an electrode group that is accommodated in the case, and a liquid nonaqueous electrolyte. The electrode group comprises a positive electrode that stores and releases a lithium ion, a negative electrode that stores and releases a lithium ion, and a separator interposed between the positive electrode and the negative electrode. The liquid nonaqueous electrolyte is impregnated at least in the separator and contains a nonaqueous solvent and an electrolyte which is dissolved in the nonaqueous solvent.

The electrode group, positive electrode, negative electrode, separator, nonaqueous electrolyte and case will be explained.

1) Electrode Group

In the electrode group, the positive electrode, the negative electrode and the separator are preferably integrated. Such a electrode group can be fabricated by use of one of methods explained in the following (i) and (ii).

(i) The positive electrode and the negative electrode with the separator interposed therebetween are wound into a flat shape, thereby obtaining a flat-shaped object. The positive electrode and the negative electrode with the separator interposed therebetween are spirally wound followed by compressing in a diameter direction, thereby obtaining a flat-shaped object. The positive electrode and the negative electrode with the separator interposed therebetween are folded one or more times, thereby obtaining a flat-shaped object. A flat-shaped object obtained according to one of the above methods is thermal molding in a laminated direction, thereby a binder contained in the positive electrode and the negative electrode is cured, and thereby the positive electrode, the negative electrode and the separator are integrated, resulting in obtaining an electrode group.

The thermal molding may be carried out after the flat shaped object is accommodated in the case or before accommodating in the case.

An atmosphere therein the thermal molding is carried out is preferable to be a reduced pressure atmosphere including a vacuum, or a normal pressure atmosphere.

The molding can be performed by use of one of, for instance, the press molding, or the charging in a mold.

A temperature at the thermal molding is preferably set in the range of 20 to 120° C. A more preferable range is 60 to 100° C.

A pressure at the thermal molding is preferable to be in the range of 0.01 to 35 kg/cm$^2$. A more preferable range is 8 to 30 kg/cm$^2$, and a still more preferable range is 12 to 25 kg/cm$^2$.

(ii) The positive electrode and the negative electrode with the separator interposed therebetween are wound into a flat shape, thereby obtaining a flat-shaped object. The positive electrode and the negative electrode with the separator interposed therebetween are spirally wound followed by compressing in a diameter direction, thereby obtaining a flat-shaped object. The positive electrode and the negative electrode with the separator interposed therebetween are folded one or more times, thereby obtaining a flat-shaped object. A flat shaped object obtained according to one of the above methods is impregnated with a polymer solution having adhesiveness, and followed by applying a vacuum drying and thereby a solvent in the solution is vaporized. Subsequently, by applying the thermal molding, the positive electrode, the negative electrode and the separator are integrated, resulting in obtaining an electrode group. In the electrode group like this, the positive electrode and the separator are integrated with the adhesive polymer that is present in spot inside thereof and at a boundary thereof, and the negative electrode and the separator are integrated with the adhesive polymer that is present in spot inside thereof and at a boundary thereof. Accordingly, while suppressing internal resistance of the secondary battery, the adhesive strength can be heightened.

The thermal molding may be applied after the flat shaped object is accommodated in the case or before it is accommodated in the case.

A polymer solution having the adhesiveness is prepared by dissolving an adhesive polymer in an organic solvent.

The polymer having the adhesiveness is preferable to be one that is capable of maintaining high adhesiveness in a state where the liquid nonaqueous electrolyte is retained. Furthermore, such a polymer is further preferable when lithium ion conductivity is high. Specifically, polyacrylonitrile (PAN), polyacrylate (PMMA), polyvinylidene fluoride (PVdF), polyvinyl chloride (PVC), polyethylene oxide (PEO) or the like can be cited. In particular, polyvinylidene fluoride is preferable. Polyvinylidene fluoride can retain the liquid nonaqueous electrolyte and partially gelates when the liquid nonaqueous electrolyte is contained, accordingly resulting in an improvement in the ion conductivity.

A boiling temperature of the solvent is preferable to be 200° C. or less, being more preferable to be 180° C. or less. The lowest limit of the boiling temperature is preferably set at 50° C., being more preferably set at 100° C.

A concentration of the polymer having adhesiveness in the solution is preferably set in the range of 0.05 to 2.5% by weight. A more preferable range of the concentration is 0.1 to 1.5% by weight.

A charge amount of the solution, when the concentration of the polymer having adhesiveness of the solution is in the range of 0.05 to 2.5% by weight, is preferable to be set in the range of 0.1 to 2 ml per 100 mAh of a battery capacity. A more preferable range of the charge amount is in the range of 0.15 to 1 ml per 100 mAh of a battery capacity.

The vacuum drying is preferably carried out at 100° C. or less. A more preferable range of the vacuum drying temperature is 40 to 100° C.

A total amount of the polymer having adhesiveness contained in the battery is preferable to be 0.1 to 6 mg per 100 mAh of a battery capacity. A more preferable range of the total amount of the polymer having adhesiveness is 0.2 to 1 mg per 100 mAh of a battery capacity.

2) Positive Electrode

The positive electrode includes a current collector and a positive electrode layer that is supported on one surface or both surfaces of the current collector and contains an active material.

The positive electrode layer contains a positive electrode active material, a binder and a conductive agent.

As the positive electrode active material, various oxides such as manganese dioxide, lithium manganese composite oxide, lithium-containing nickel oxide, lithium-containing cobalt oxide, lithium-containing nickel cobalt oxide, lithium-containing iron oxide, and lithium-containing vanadium oxide, and chalcogenides such as titanium disulfide and molybdenum disulfide can be cited. Among these, when one of lithium-containing cobalt oxide (for instance, $LiCoO_2$), lithium-containing nickel cobalt oxide (for instance, $LiNi_{0.8}Co_{0.2}O_2$), and lithium manganese composite oxide (for instance, $LiMn_2O_4$, $LiMnO_2$) is used, a high voltage can be preferably obtained.

As the conductive agent, for instance, acetylene black, carbon black, graphite and so on can be cited.

The binder has a function of retaining the active material on the current collector and combining active materials each other. As the binder, for instance, polytetrafluoroethylene (PTFE), polyvinylidene fluoride (PVdF), ethylene-propylene-diene copolymer (EPDM), styrene-butadiene rubber (SBR) and so on can be used.

Blending ratios of the positive electrode active material, the conductive agent and the binder, respectively, are preferable to be in the range of 80 to 95% by weight, 3 to 20% by weight, and 2 to 7% by weight.

As the current collector, a porous conductive substrate, or a non-porous conductive substrate can be used. These conductive substrates can be formed of, for instance, aluminum, stainless steel, or nickel.

Among these, a conductive substrate having a two-dimensional porous structure in which pores having a diameter of 3 mm or less are present at a rate of one or more per 10 $cm^2$ can be preferably used. The diameter of the pore is preferably set in the range of 0.1 to 1 mm. The presence rate of the pores is preferably set in the range of 10 to 20 per 10 $cm^2$.

The conductive substrate having a two-dimensional porous structure in which pores having a diameter of 3 mm or less are present at a rate of one or more per 10 $cm^2$ can be preferably formed in a thickness in the range of 15 to 100 $\mu$m. A more preferable range of the thickness is 30 to 80 $\mu$m.

The positive electrode can be prepared, for instance, by suspending the positive electrode active material, the binder and the conductive agent in an appropriate solvent, followed by coating the suspension on the current collector, subsequently drying, and further followed by pressing into a thin plate.

Furthermore, when the electrode group is fabricated according to a method explained in the (ii), the positive electrode further contains a polymer having adhesiveness.

3) Negative Electrode

The negative electrode includes a current collector and a negative electrode layer that is supported on one surface or both surfaces of the current collector.

The negative electrode layer includes a carbonaceous material that stores and releases a lithium ion and a binder.

As the carbonaceous material, graphitized material or carbon material such as graphite, cokes, carbon fiber, and spherical carbon, or graphitized material or carbon material obtained by heat-treating thermosetting resins, isotropic pitch, mesophase pitch, mesophase-pitch based carbon fiber, and mesophase globules at 500 to 3000° C. can be cited. In particular, mesophase pitch based carbon fiber is preferable because of higher capacity and charge-discharge cycle characteristics. Among these, graphitized material that has a graphite crystal that can be obtained by applying the heat-treatment at a temperature of 2000° C. or more and has an average layer spacing $d_{002}$ derived from (002) reflection of 0.34 nm or less can be preferably used. A nonaqueous electrolyte secondary battery comprising a negative electrode that contains graphitized material like this as the carbonaceous material can largely improve a battery capacity and large current discharge characteristics. The average layer spacing $d_{002}$ is more preferable to be 0.336 nm or less.

In addition, a lower limit of the average layer spacing is preferable to be an average layer spacing $d_{002}$ derived from (002) reflection in a complete graphite crystal, that is, 0.3354 nm.

As the binder, for instance, polytetrafluoroethylene (PTFE), polyvinylidene fluoride (PVdF), ethylene-propylene-diene copolymer (EPDM), styrene-butadiene rubber (SBR), carboxylmethyl cellulose (CMC) and so on can be used.

Blending ratios of the carbonaceous material and the binder, respectively, are preferably in the range of 90 to 98% by weight and 2 to 20% by weight.

As the current collector, a porous conductive substrate, or a non-porous conductive substrate can be used. These conductive substrates can be formed of, for instance, copper, stainless steel, or nickel.

Among these, a conductive substrate having a two-dimensional porous structure in which pores having a diameter of 3 mm or less are present at a rate of one or more per 10 cm$^2$ can be preferably used. The diameter of the pore is preferably set in the range of 0.1 to 1 mm. The presence rate of the pores is preferably set in the range of 10 to 20 per 10 cm$^2$.

The conductive substrate having a two-dimensional porous structure in which the pores having a diameter of 3 mm or less are present at a rate of one or more per 10 cm$^2$ can be preferably formed in a thickness in the range of 10 to 50 μm.

The negative electrode can be prepared, for instance, by kneading the carbonaceous material that can store and release a lithium ion and the binder in the presence of a solvent followed by coating an obtained suspension on the current collector, further followed by drying, and still further followed by pressing in one stage or multi-stages of two to five times under a desired pressure.

Furthermore, when the electrode group is fabricated according to a method explained in the (ii), the negative electrode further contains a polymer having adhesiveness.

The negative electrode layer can be, other than ones that contain the carbonaceous material that can store and release a lithium ion, ones that contain a metal such as aluminum, magnesium, tin or silicon, or a metal compound selected from metal oxides, metal sulfides and metal nitrides, or a lithium alloy.

As the metal oxides, for instance, tin oxide, silicon oxide, lithium titanium oxide, niobium oxide, and tungsten oxide can be cited.

As the metal sulfides, for instance, tin sulfide and titanium sulfide can be cited.

As the metal nitrides, for instance, lithium cobalt nitride, lithium iron nitride, and lithium manganese nitride can be cited.

As the lithium alloys, for instance, lithium aluminum alloy, lithium tin alloy, lithium lead alloy, and lithium silicon alloy can be cited.

4) Separator

The separator is formed of, for instance, a porous sheet.

As the porous sheet, for instance, a porous film or nonwoven fabric can be used. The porous sheet is preferably formed of at least one kind of material selected from, for instance, polyolefins and cellulose. As the polyolefins, for instance, polyethylene and polypropylene can be cited. Among these, a porous film made of polyethylene, or polypropylene, or both of these can improve safety of the secondary battery, accordingly, is preferable.

A thickness of the porous sheet is preferably set at 30 μm or less, a more preferable range being 25 μm or less. In addition, a lower limit of the thickness is preferably set at 5 μm, being furthermore preferable to be 8 μm.

The porous sheet is preferable to be 20% or less in the thermal shrinkage rate under the conditions of 120° C. and 1 hour. The thermal shrinkage rate is more preferably set at 15% or less.

The porous sheet preferably has porosity in the range of 30 to 60%. A more preferable porosity range is 35 to 50%.

The porous sheet is preferable to have air permeability of 600 s/100 cm$^3$ or less. The air permeability denotes a time (sec) necessary for 100 cm$^3$ of air permeating through the porous sheet. An upper limit of the air permeability is more preferably set at 500 s/100 cm$^3$. In addition, a lower limit of the air permeability is preferably set at 50 s/100 cm$^3$, being more preferably set at 80 sec/100 cm$^3$.

Furthermore, when the electrode group is prepared according to the method explained in (ii), the separator further contains a polymer having adhesiveness.

5) Liquid Nonaqueous Electrolyte

The liquid nonaqueous electrolyte includes a nonaqueous solvent and an electrolyte which is dissolved in the nonaqueous solvent as a solute.

For the nonaqueous solvent, either one of the (A) and (B) can be used. First, the nonaqueous solvent A will be explained.

Reasons for providing the ratios of the respective solvents to a total of the nonaqueous solvent in the above ranges will be explained.

a. γ-Butyrolactone (GBL)

GBL can control a reaction mainly between the negative electrode and PC. When the GBL is not added, the reaction between a negative electrode surface and PC proceeds from a time of the initial charge, resulting in swelling the battery case because of a gas generated by the reaction. The GBL is added with a primary intention of controlling the reaction between the negative electrode and the PC, and thereby suppressing a gas from generating at the initial charge and the battery case from swelling. However, when the ratio of the GBL is increased to 30% by volume or more, reactivity between the negative electrode surface and the GBL becomes higher particularly during high temperatures, a reductive decomposition of the nonaqueous electrolyte proceeds, a film that disturbs a charge-discharge reaction is formed on a surface of the negative electrode. As a result, under a high temperature environment, a longer cycle life cannot be obtained.

When the ratio of the GBL is less than 30% by volume, though not clear in the reasons, both PC and GBL are suppressed from reacting with the negative electrode. In addition, the presence of the fourth component multiplies the suppression effect.

A more preferable ratio (z) is 1% by volume or more and less than 30% by volume, further more preferable ratio (z) being 1% by volume or more and 25% by volume or less, the most preferable ratio (z) being 2% by volume or more and 15% by volume or less.

b. Ethylene Carbonate (EC)

When the ratio (x) of EC to the total volume of the nonaqueous solvent is set at less than 15% by volume, since the negative electrode surface can hardly be covered with a protection film derived from EC, the reaction between the negative electrode and the PC or the GBL proceeds, and thereby causing a gas generation during the initial charge or high temperature storage and ensuing swelling of the case. On the other hand, when the ratio (x) exceeds 50% by volume, since the viscosity of the liquid nonaqueous electrolyte becomes higher and the ionic conductivity is liable to decrease, the discharge characteristics under a low temperature (for instance, a range of 0° C. to −40° C.) environment is appreciably deteriorated. A more preferable range of the ratio (x) of the EC is 20% by volume or more and 50% by volume or less, and a further preferable range of the ratio (x) is 25% by volume or more and 50% by volume or less.

c. Propylene Carbonate (PC)

When the ratio (y) of PC to the total volume of the nonaqueous solvent is set less than 30% by volume, the reaction between the negative electrode and the GBL becomes dominant, even when the fourth component is present, it is difficult to improve the high temperature cycle life. On the other hand, when the ratio (y) of the PC exceeds 75% by volume, at the initial charge, the reaction between the negative electrode and the PC becomes prevailing, resulting in difficulty in suppressing the gas generation and the swelling of the case. A more preferable range of the ratio (y) of the PC is 30% by volume or more and 70% by volume or less, and a furthermore preferable range is 30% by volume or more and 65% by volume or less.

d. Fourth Component

When the fourth component is not present in the nonaqueous solvent, since the denseness of the protection film formed on the negative electrode surface or permeability of a lithium ion decreases, not only the gas generation during the initial charge and high temperature storage cannot be suppressed, but also the high temperature charge-discharge cycle life cannot be improved. However, when the ratio (p) of the fourth component to the total volume of the nonaqueous solvent exceeds 5% by volume, the gas generation during the high temperature storage and the initial charge may be promoted, or the lithium ion permeability of the protection film formed on the negative electrode surface may decrease and thereby impedance of the negative electrode is increased, resulting in incapability of obtaining a longer cycle life. Accordingly, the ratio (p) of the fourth component to a total volume of the nonaqueous solvent is preferably set in the range of more than 0% by volume and 5% by volume or less. A more preferable range of the fourth component is 4% by volume or less, a furthermore preferable range is 3% by volume or less, and the most preferable range is 0.1% by volume to 2% by volume.

A nonaqueous electrolyte containing the fourth component that contains vinyl ethylene carbonate (VEC) is advantageous in improving the high temperature charge-discharge cycle life, and furthermore can suppress self-discharge under a high temperature environment. Furthermore, when the VC is contained in the nonaqueous electrolyte, low temperature discharge characteristics and room temperature cycle characteristics can be improved.

When vinyl ethylene carbonate (VEC) is used as the fourth component, a preferable range is 5% by volume or less, a more preferable range is 3% by volume or less, and a furthermore preferable range is 2% by volume or less. Furthermore, in order to obtain sufficient high temperature charge-discharge cycle life, a lower limit of the fourth component is preferably set at 0.05% by volume.

According to a nonaqueous electrolyte containing the fourth component that contains phenyl ethylene carbonate (phEC), also the charge-discharge cycle life at room temperature is improved. That is, over a large temperature region, a longer cycle life can be obtained. Furthermore, when VC is contained in the nonaqueous electrolyte, the high temperature charge-discharge cycle life can be more improved and the self-discharge under a high temperature environment can be suppressed.

When phenyl ethylene carbonate (phEC) is used as the fourth component, a preferable range is 5% by volume or less, a more preferable range is 4% by volume or less, and the most preferable range is 3% by volume or less. In order to obtain a sufficient charge-discharge cycle life, a lower limit of the fourth component is preferably set at 0.05% by volume.

In addition, as the fourth component, other solvents than VEC and phEC can be used.

As the other solvents, for instance, 1,3-propanesultone, vinylene carbonate (VC), ethylene sulfite (ES), 12-crown-4 (Crown), tetraethylene glycol dimethyl ether (Ether), diethyl carbonate (DEC), dimethyl carbonate (DMC), ethyl methyl carbonate (EMC), γ-valerolactone (VL), methyl propionate (MP), ethyl propionate (EP), 2-methyl-furan (2Me-F), furan (F), thiophene (TIOP), catechol carbonate (CATC) and so on can be cited. The kind of other solvents used as the fourth component can be one kind or two kinds or more.

When the fourth component that contains one or more kinds of other solvents selected from the above kinds and at least one kind of solvent selected from a group consisting of VEC and phEC is used, the high temperature charge-discharge cycle life can be furthermore improved.

Next, the nonaqueous solvent B will be explained.

Reasons for the ratios of the respective solvents to a total of nonaqueous solvent being provided in the ranges will be explained.

a. γ-Butyrolactone (GBL)

The reasons for the ratio (z) of GBL in the nonaqueous solvent being provided less than 30% by volume are similar to ones that are explained in the nonaqueous solvent A. A more preferable ratio (z) is 1% by volume or more and less than 30% by volume, a more preferable ratio (z) is 1% by volume or more and 25% by volume or less, and the most preferable ratio (z) is 2% by volume or more and 15% by volume or less.

b. Ethylene Carbonate (EC)

The reasons for the ratio (x) of EC in the nonaqueous solvent being provided in the range of 15 to 50% by volume are similar to ones explained in the nonaqueous solvent A. A more preferable range of the ratio (x) of the EC is 20% by volume or more and 50% by volume or less and a more preferable range is 25% by volume or more and 50% by volume or less.

c. Propylene Carbonate (PC)

The reasons for the ratio (y) of PC in the nonaqueous solvent being provided in the range of 30 to 75% by volume are similar to ones explained in the nonaqueous solvent A. A more preferable range of the ratio (y) of the PC is 30% by volume or more and 70% by volume or less, and a more preferable range is 30% by volume or more and 65% by volume or less.

d. Vinylene Carbonate (VC)

VC is added with an intention that while suppressing an interfacial resistance of the negative electrode from increasing, the denseness of a protection film formed on the negative electrode surface is increased. As a result, the gas generation during the initial charge and high temperature storage is suppressed and high temperature cycle life is improved without other battery characteristics such as the storage characteristics being deteriorated. However, when the ratio (w) of VC in the nonaqueous solvent exceeds 5% by volume, the gas generation during the high temperature storage and the initial charge may be promoted, or the lithium ion permeability of the protection film formed on the negative electrode surface may be deteriorated to increase impedance of the negative electrode, and thereby the low temperature discharge characteristics are deteriorated. A preferable range of the ratio (w) of VC to the total volume of the nonaqueous solvent is 3% by volume or less, and a more preferable range is 2% by volume or less. Furthermore, in order to obtain a sufficient high temperature charge-discharge cycle life, a lower limit of the ratio (w) of VC is preferably set at 0.05% by volume, and a more preferable lower limit is 0.1% by volume.

The VC, during the initial charge-discharge process, migrates from the nonaqueous solvent to the negative electrode surface and sticks to the surface of the negative electrode. It follows that, in the nonaqueous solvent present in the secondary battery after the initial charge-discharge process, the mixing ratio of VC based on the total nonaqueous solvent is lowered, compared with the state before assembly of the secondary battery. A diminution ratio becomes, for instance, when an addition amount of VC is 1% by weight, 70 to 80% (that is, a residual ratio is 20 to 30%).

e. Fifth Component

When the fifth component is not present in the nonaqueous solvent, the denseness of the protection film formed on the negative electrode surface or the lithium ion permeability thereof is deteriorated. Accordingly, not only the gas generation at the initial charge cannot be suppressed, but also it is difficult to improve the high temperature cycle life. However, when the ratio (q) of the fifth component to the total volume of the nonaqueous solvent exceeds 5% by volume, the gas generation during the high temperature storage and the initial charge may be promoted, or the lithium ion permeability of the protection film formed on the negative electrode surface may be deteriorated to increase the impedance of the negative electrode, and thereby the low temperature discharge characteristics or the room temperature cycle life may be deteriorated. Accordingly, the ratio (q) of the fifth component to the total volume of the nonaqueous solvent is preferably set in the range of more than 0% by volume and 5% by volume or less. A more preferable range of the fifth component is 4% by volume or less, a furthermore preferable range is 3% by volume or less, and the most preferable range is 0.1 to 2% by volume.

The nonaqueous electrolyte containing the fifth component that contains vinyl ethylene carbonate (VEC) is advantageous in improving the high temperature charge-discharge cycle life, and, at the same time, can suppress the self-discharge under a high temperature environment and can improve the low temperature discharge characteristics. In this case, a total amount (r+w) of VEC and VC is preferable to satisfy the following equation (10).

$$0 < r+w \leq 6 \tag{10}$$

In the above equation, the w is a ratio (volume %) of vinylene carbonate to the total volume of the nonaqueous solvent, and the r is a ratio (volume %) of vinyl ethylene carbonate to the total volume of the nonaqueous solvent.

This is because when a total amount (r+w) of VEC and VC exceeds 6% by volume, the gas generation during the high temperature storage and the initial charge is liable to be promoted, or the lithium ion permeability of the protection film formed on the negative electrode surface may be lowered to cause an increase in the impedance of the negative electrode, and thereby a sufficient low temperature discharge characteristics may not be obtained. The total amount (r+w) of VEC and VC is preferable to be set in the range of 4% by volume or less. Thereby, the gas generation during the high temperature storage and the initial charge can be further reduced, or the low temperature discharge characteristics can be improved. A more preferable range of the total amount (r+w) is 2% by volume or less.

When the total amount (r+w) of VEC and VC is set in the range provided in the above equation (10), the ratio r (volume %) of VEC to the total volume of the nonaqueous solvent is preferably set in the range provided by the following equation (11).

$$0.05 \leq r \leq 2 \tag{11}$$

This is due to the reasons described below. When the ratio (r) of VEC is less than 0.05% by volume, excellent high temperature cycle characteristics may not be obtained. On the other hand, when the ratio (r) of VEC exceeds 2% by volume, since interfacial resistance of the negative electrode increases, the low temperature discharge characteristics may deteriorate. A more preferable range of the ratio (r) of VEC is in the range of 0.1 to 2% by volume.

When the total amount (r+w) of VEC and VC is set in the range provided in the equation (10) and the ratio r (volume %) of VEC is set in the range provided in the equation (11), the ratio (w) of VC is preferably set at 0.05% by volume or more. This is because when the ratio (w) of VC is set at less than 0.05% by volume, since resistance of the protection film formed on the negative electrode surface increases, the room temperature cycle characteristics or the low temperature discharge characteristics may decrease. A more preferable range of the ratio (w) of VC is 0.1% by volume or more.

When vinyl ethylene carbonate (VEC) is used as the fifth component, a preferable range is 5% by volume or less, a more preferable range is 3% by volume or less, and a still more preferable range is 2% by volume or less. In order to obtain a sufficient high temperature charge-discharge cycle life, a lower limit of the fifth component is preferably set at 0.05% by volume.

According to a nonaqueous electrolyte containing the fifth component that contains phenyl ethylene carbonate (phEC), the room temperature charge-discharge cycle life can be improved and the self-discharge under a high temperature environment can be suppressed. In this case, a total amount (s+w) of phEC and VC is preferable to satisfy the following equation (12).

$$0 < s+w \leq 7 \tag{12}$$

In the above, the w is a ratio (volume %) of vinylene carbonate to the total volume of the nonaqueous solvent, and the s is a ratio (volume %) of phenyl ethylene carbonate to the total volume of the nonaqueous solvent.

This is because when the total amount (s+w) of phEC and VC exceeds 7% by volume, the gas generation during the high temperature storage and the initial charge is liable to be promoted, or the lithium ion permeability of the protection film formed on the negative electrode surface is deteriorated to increase the impedance of the negative electrode, and thereby a sufficient cycle life may not be obtained. In order to further reduce the gas generation during the high temperature storage and the initial charge, the total amount (s+w) of phEC and VC is preferably set at 5% by volume or less, and a more preferable range is 3% by volume or less.

When the total amount (s+w) of phEC and VC is in the range provided by the equation (12), the ratio (s) of phEC to the total volume of the nonaqueous solvent is preferable to be set in the range provided by the following equation (13).

$$0.05 \leq s \leq 5 \tag{13}$$

This is due to the reasons explained below. When the ratio (s) of phEC is set at less than 0.05% by volume, excellent cycle characteristics may not be obtained. On the other hand, when the ratio (s) of phEC exceeds 5% by volume, since the interfacial resistance of the negative electrode increases, the low temperature discharge characteristics or the room temperature cycle characteristics may be deteriorated. A more preferable range of the ratio (s) of phEC is 0.05 to 4% by volume.

When phenyl ethylene carbonate (phEC) is used as the fifth component, a preferable range is 5% by volume or less, a more preferable range is 4% by volume or less, and the most preferable range is 3% by volume or less. In order to obtain a sufficient charge-discharge cycle life, a lower limit of the fifth component is preferably set at 0.05% by volume.

Furthermore, as the fifth component, other solvents than VEC and phEC can be used.

As the other solvents, for instance, 1,3-propanesultone, ethylene sulfite (ES), 12-crown-4 (Crown), tetraethylene glycol dimethyl ether (Ether), diethyl carbonate (DEC), dimethyl carbonate (DMC), ethyl methyl carbonate (EMC), γ-valerolactone (VL), methyl propionate (MP), ethyl propionate (EP), 2-methyl-furan (2Me-F), furan (F), thiophene (TIOP), catechol carbonate (CATC) and so on can be cited. The kind of other solvents used as the fifth component can be one kind or two kinds or more.

When the fifth component that contains one or more kinds of other solvents selected from the above kinds and at least one kind of solvent selected from a group consisting of VEC and phEC is used, the high temperature charge-discharge cycle life can be furthermore improved.

As the electrolytes that can be dissolved in the nonaqueous solvents A and B, for instance, lithium salts such as lithium perchlorate ($LiClO_4$), lithium hexafluorophosphate ($LiPF_6$), lithium tetrafluoro borate ($LiBF_4$), lithium hexafluoroarsenate ($LiAsF_6$), lithium trifluoromethanesulfonate ($LiCF_3SO_3$), lithium bis-trifluoro methylsulfonylimide ($LiN(CF_3SO_2)_2$), and $LiN(C_2F_5SO_2)_2$ can be cited. The kind of the electrolyte being used may be one kind or two kinds or more.

Among these, one that contains $LiPF_6$ or $LiBF_4$ is preferable. Furthermore, when an mixed salt that contains an imide salt that is made of at least one of $LiN(CF_3SO_2)_2$ and $LiN(C_2F_5SO_2)_2$ and a salt made of at least one of $LiBF_4$ and $LiPF_6$, the high temperature cycle life can be further improved. Still furthermore, since thermal stability of the electrolyte can be improved, a voltage lowering due to the self-discharge during the storage under a high temperature environment can be suppressed.

A dissolving amount of the electrolyte to the nonaqueous solvent is preferable to be set in the range of 0.5 to 2.5 mol/L. A more preferable range is 1 to 2.5 mol/L.

The liquid nonaqueous electrolyte may preferably contain a surfactant such as trioctyl phosphate (TOP) to improve wettability with the separator. A dissolving amount of the surfactant is preferable to be 3% or less, and a more preferable range is 0.1 to 1%.

An amount of the liquid nonaqueous electrolyte is preferably set in the range of 0.2 to 0.6 g/100 mAh battery capacity. A more preferable range of the liquid nonaqueous electrolyte is 0.25 to 0.55 g/100 mAh.

6) Case (Accommodating Case)

A shape of the case can be, for instance, a bottomed cylinder, a bottomed rectangular prism, a bag shape and so on.

The case can be formed of, for instance, a sheet containing a resin layer, a metal plate, a metal film and the like.

The resin layer contained in the sheet may be formed of, for instance, poly-olefins (for instance, polyethylene, polypropylene) and so on. As the sheet, a sheet in which a metal layer and protection layers disposed on both surfaces of the metal layer are integrated is preferably used. The metal layer can shield moisture. As the metal layer, for instance, aluminum, stainless steel, iron, copper, nickel and so on can be cited. Among these, aluminum that is light in weight and high in the function of shielding moisture is preferable. The metal layer may be formed of one kind of metal or one in which two or more kinds of metals are integrated. Among the two protection layers, one in contact with the outside can inhibit damage of the metal layer from being caused. The external protection layer is made of one kind of resin layer, or two or more kinds of resin layers. On the other hand, an internal protection layer can inhibit the nonaqueous electrolyte from corroding the metal layer. The internal protection layer is made of one kind of resin layer or two kinds or more of resin layers. Furthermore, on a surface of the internal protection layer like this, a thermosetting resin can be arranged.

The metal plate and the metal film can be formed of, for instance, iron, stainless steel, aluminum and so on.

A thickness of the case (thickness of case wall) is preferably set at 0.3 mm or less. This is because when the thickness is larger than 0.3 mm, it is difficult to obtain a high weight energy density and a high volume energy density. A preferable range of the thickness of the case is 0.25 mm or less, a more preferable range is 0.15 mm or less, and the most preferable range is 0.12 mm or less. Furthermore, when the thickness is less than 0.05 mm, the case is liable to be deformed or damaged. Accordingly, a lower limit of the thickness of the case is preferably set at 0.05 mm.

The thickness of the case can be measured with a method described below. That is, in a region excluding a sealing portion of the case, three points are arbitrarily selected 1 cm or more apart from each other, the thicknesses of the respective points are measured, an average value is calculated therefrom, and the calculated value is regarded as the thickness of the case. When foreign matter (for instance, resin) is attached to a surface of the case, after removing the foreign matter, the thickness is measured. For instance, when PVdF is adhered onto the surface of the case, the PVdF is removed by wiping the surface of the case with a dimethyl formamide solution, and thereafter the thickness is measured.

The electrode group can be preferably adhered to an inner surface of the case with an adhesive layer that is partially formed at least on the inner surface of the case. When configured thus, the case can be fixed onto the surface of the electrode group, accordingly the liquid nonaqueous electrolyte can be hindered from permeating into a space between the electrode group and the case.

The secondary battery is preferably subjected to the initial charge under the temperature condition of 15° C. to 80° C. and a rate of 0.05 C or more and 0.8 C or less. The charge under the conditions may be one cycle or two or more cycles may be performed. Furthermore, before the initial charge, the secondary battery may be stored under the temperature condition of 15° C. to 80° C. for substantially 1 to 20 hours.

Now, 1 C is a current value necessary for discharging a nominal capacity (Ah) in 1 hour.

The reasons for providing the temperature of the initial charge in the above range are as follows. When the initial charge temperature is less than 15° C., the viscosity of the liquid nonaqueous electrolyte remains high. Accordingly, it is difficult to uniformly impregnate the positive electrode, negative electrode and separator with the liquid nonaqueous electrolyte. As a result, an internal impedance increases, and a utilization of the active material decreases. On the other hand, when the initial charge temperature exceeds 80° C., the binder contained in the positive electrode and the negative electrode deteriorates. Accordingly, a preferable range of charge temperature is 15 to 60° C., and a more preferable range is 20 to 50° C.

When the rate of the initial charge is set in the range of 0.05 to 0.8 C, the swell of the positive electrode and negative electrode due to the charge can be appropriately delayed. Accordingly, the liquid nonaqueous electrolyte can be uniformly impregnated into the positive electrode and negative electrode. A preferable rate of the initial charge is 0.05 to 0.5 C.

By providing the processes like this, since the liquid nonaqueous electrolyte can be uniformly impregnated into a gap of the electrode and separator, the internal impedance of the secondary battery can be made smaller. As a result, since the utilization of the active material can be increased, a substantial battery capacity can be made larger. Furthermore, the charge-discharge cycle characteristics and large current discharge characteristics of the battery can be improved.

A thin lithium ion secondary battery that is an example of a nonaqueous electrolyte secondary battery (I) according to the present invention will be detailed with reference to FIGS. 1 and 2.

Figure 2:
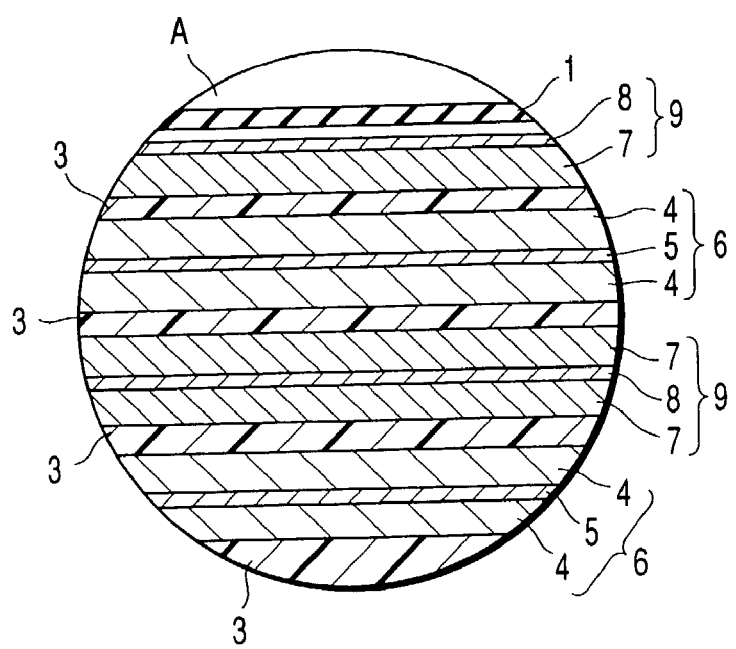
FIG. 2 is an enlarged sectional view showing an A portion of FIG. 1.

FIG. 1 is a sectional view showing a thin lithium ion secondary battery that is an example of a nonaqueous electrolyte secondary battery (I) according to the present invention, and FIG. 2 is an enlarged sectional view showing an A portion of FIG. 1.

As shown in FIG. 1, in a case 1 having a desired thickness X, an electrode group 2 is accommodated. The electrode group 2 has a structure in which a laminate body of a positive electrode, a separator and a negative electrode is wound into a flat shape. The laminate body, as shown in FIG. 2, is made of one in which (from bottom up in the drawing) a separator 3, a positive electrode 6 comprising a positive electrode layer 4 and a positive electrode current collector 5 and a positive electrode layer 4, a separator 3, a negative electrode 9 comprising a negative electrode layer 7 and a negative electrode current collector 8 and a negative electrode layer 7, a separator 3, a positive electrode 6 comprising a positive electrode layer 4 and a positive electrode current collector 5 and a positive electrode layer 4, a separator 3, and a negative electrode 9 comprising a negative electrode layer 7 and a negative electrode current collector 8 are laminated in this order. In the electrode group 2, the negative electrode current collector 8 is located in the outermost layer. A ribbon-like positive electrode lead 10 is connected to the positive electrode current collector 5 of the electrode group 2 at one end thereof, and the other end thereof is extended out of the case 1. On the other hand, a ribbon negative electrode 11 is connected to the negative electrode current collector 8 of the electrode group 2 at one end thereof, and the other end thereof is extended out of the case 1.

Subsequently, a nonaqueous electrolyte secondary battery (II) according to the present invention will be explained.

The nonaqueous electrolyte secondary battery includes a case and an electrode group accommodated in the case. The electrode group includes a positive electrode that stores/releases a lithium ion, a negative electrode that stores/releases a lithium ion, and an electrolyte layer that is arranged between the positive electrode and the negative electrode. The electrolyte layer contains a liquid nonaqueous electrolyte and a polymer that has a function of gelating the liquid nonaqueous electrolyte.

For the case, the positive electrode, the negative electrode and the nonaqueous electrolyte, ones similar to those explained in the nonaqueous electrolyte secondary battery (I) can be used.

The electrolyte layer can be prepared according to, for instance, a method explained below. First, a paste that contains a polymer having a function of gelating a liquid nonaqueous electrolyte and the liquid nonaqueous electrolyte is coated and dried. An obtained thin film is interposed between a positive electrode and a negative electrode, and thereby an electrode group is prepared. The electrode group is impregnated with the liquid nonaqueous electrolyte followed by plasticizing the thin film under a reduced pressure, and thereby the electrolyte layer is obtained.

The polymer is preferable to be thermoplastic. As such polymers, for instance, at least one kind selected from polyvinylidene fluoride (PVdF), polyacrylonitrile (PAN), polyethylene oxide (PEO), polyvinyl chloride (PVC), polyacrylate (PMMA), and polyvinylidene fluoride hexafluoropropylene (PVdF-HFP) can be used.

The secondary battery is preferably subjected to the initial charge under the temperature condition of 15° C. to 80° C. and a rate of 0.05 C or more and 0.8 C or less. The charge under the condition may be one cycle or two or more cycles. Furthermore, before the initial charge, the secondary battery may be stored under the temperature condition of 15° C. to 80° C. for 1 to 20 hours.

The first nonaqueous electrolyte secondary battery according to the present invention explained above includes a case, an electrode group which is accommodated in the case, and a nonaqueous electrolyte. The nonaqueous electrolyte is retained by the electrode group and contains the nonaqueous solvent A.

The nonaqueous solvent A includes ethylene carbonate (EC), propylene carbonate (PC), γ-butyrolactone (GBL), and a fourth component that is a solvent other than the EC, the PC and the GBL. When ratios of ethylene carbonate, propylene carbonate, γ-butyrolactone, and the fourth component, respectively, are taken as x (volume %), y (volume %), z (volume %) and p (volume %), the x, the y, the z and the p, respectively, satisfy $15 \leq x \leq 50$, $30 \leq y \leq 75$, $0 < z < 30$ and $0 < p \leq 5$.

In order to improve the weight energy density and volume energy density of a nonaqueous electrolyte secondary battery, a thickness of the case is preferable to be 0.3 mm or less. However, the case having a thickness of 0.3 mm or less is liable to swell owing to a gas generated in the case.

When the ratio of γ-butyrolactone to a total volume of the nonaqueous solvent is set in the range of less than 30% by volume, during the storage under a high temperature condition and at the initial charge, the nonaqueous electrolyte can be suppressed from undergoing the oxidative degradation caused by a reaction between the positive electrode and the nonaqueous electrolyte. As a result, since an amount of gas generation during the high temperature storage and the initial charging can be reduced, even when the thickness of the case is set at 0.3 mm or less, the case can be suppressed from swelling, and a high initial charge efficiency can be obtained.

Furthermore, when the ratio of ethylene carbonate to the total nonaqueous solvent is set at 15% by volume or more and 50% by volume or less, that of propylene carbonate is set at 30% by volume or more and 75% by volume or less, and that of the fourth component is set at 5% by volume or less, a lithium ion permeable protection film can be densely formed on a surface of the negative electrode. As a result, since the reactivity of the negative electrode with γ-butyrolactone under a high temperature environment can be reduced, the nonaqueous electrolyte can be suppressed from undergoing the reductive decomposition, and the interfacial impedance of the negative electrode can be suppressed from rising. Accordingly, the charge-discharge cycle life at high temperatures can be improved.

A second nonaqueous electrolyte secondary battery according to the present invention includes a case, an electrode group accommodated in the case, and a nonaqueous electrolyte. The nonaqueous electrolyte is held by the electrode group and contains a nonaqueous solvent B.

The nonaqueous solvent B contains ethylene carbonate (EC), propylene carbonate (PC), γ-butyrolactone (GBL), vinylene carbonate (VC), and a fifth component that is a solvent other than the EC, the PC, the GBL and the VC. When ratios of ethylene carbonate, propylene carbonate, γ-butyrolactone, vinylene carbonate and the fifth component to the total volume of the nonaqueous solvent, respectively, are taken as x (volume %), y (volume %), z (volume %), w (volume %), and q (volume %), the x, the y, the z, the w and the q, respectively, satisfy $15 \leq x \leq 50$, $30 \leq y \leq 75$, $0 < z < 30$, $0 < w \leq 5$ and $0 < q \leq 5$.

According to the secondary battery thus formed, since a dense protection film excellent in the lithium ion permeability can be formed on a surface of the negative electrode, a gas generation suppression effect at the initial charge or the charge-discharge cycle life at the high temperatures can be further heightened.

In the following, Examples of the present invention will be detailed with reference to the aforementioned drawings.

EXAMPLE 1

<Preparation of Positive Electrode>

First, lithium cobalt oxide ($Li_xCoO_2$; $0 < x \leq 1$) powder 91% by weight, acetylene black 3% by weight, graphite 3% by weight, and polyvinylidene fluoride (PVdF) as a binder 3% by weight are added to and mixed with N-methyl-2-pyrrolidone (NMP) as a solvent, and thereby a slurry was prepared. The slurry was coated on both surfaces of a current collector made of a aluminum foil having a thickness of 15 μm followed by drying and pressing, and thereby a positive electrode having an electrode density of 3 g/cm³ and a structure in which a positive electrode layer is held on both surfaces of the current collector was prepared.

<Preparation of Negative Electrode>

As the carbonaceous material, mesophase-pitch based carbon fiber heat-treated at 3000° C. (a fiber diameter of 8 μm, an average fiber length of 20 μm, an average layer spacing ($d_{002}$) of 0.3360 nm) powder 93% by weight and polyvinylidene fluoride (PVdF) as a binder 7% by weight are mixed, and thereby a slurry was prepared. The slurry was coated on both surfaces of a current collector made of a copper foil having a thickness of 12 μm followed by drying and pressing, and thereby a negative electrode having an electrode density of 1.4 g/cm³ and a structure in which a negative electrode layer is supported on the current collector was prepared.

An average layer spacing $d_{002}$ derived from (002) reflection was a value obtained from a powder X-ray spectrum according to FWHM (full width at half-maximum middle point) method. At this time, a scattering correction such as Lorentz scattering correction was not applied.

<Separator>

A separator made of a porous polyethylene film having a thickness of 25 μm, a thermal shrinkage of 20% under conditions of 120° C. and 1 hour, and porosity of 50% was prepared.

<Preparation of Liquid Nonaqueous Electrolyte>

Ethylene carbonate (EC), γ-butyrolactone (GBL), propylene carbonate (PC) and vinyl ethylene carbonate (VEC) are mixed so that the respective volume ratios (EC:GBL:PC:VEC) may be 31:6:62:1, and thereby a nonaqueous solvent was prepared. Lithium tetrafluoro borate ($LiBF_4$) was dissolved in the obtained nonaqueous solvent so that a concentration thereof may be 1.5 mol/L, and thereby a liquid nonaqueous electrolyte was prepared.

<Preparation of Electrode Group>

After a ribbon-like positive electrode lead was welded to the current collector of the positive electrode and a ribbon-like negative electrode lead was welded to the current collector of the negative electrode, the positive electrode and the negative electrode are spirally wound with the separator interposed therebetween followed by forming into a flat shape, and thereby an electrode group was prepared.

The electrode group was press-molded under heating at 90° C. under a pressure of 13 kg/cm² for 25 s, and thereby the positive electrode, the negative electrode and separator are integrated.

A 100 μm thick laminate film that was formed by covering both surfaces of an aluminum foil with polypropylene was formed pouch-like, and the electrode group was accommodated therein.

Subsequently, the vacuum drying was applied to the electrode group in the laminate film at 80° C. for 12 hours, and thereby moisture contained in the electrode group and the laminate film was removed.

The liquid nonaqueous electrolyte was injected into the electrode group in the laminate film so that an amount thereof a battery capacity 1 Ah may be 4.8 g, and a thin nonaqueous electrolyte secondary battery having a structure shown in FIGS. 1 and 2, a thickness of 3.6 mm, a width of 35 mm and a height of 62 mm was assembled.

To the nonaqueous electrolyte secondary battery, as the initial charge/discharge process, the following processes are applied. First, after leaving for 2 hours under a high temperature environment of 45° C., under the environment, a constant current/constant voltage charge was carried out at 0.2 C (104 mA) for 15 hours up to 4.2 V. Thereafter, it was left at 20° C. over 7 days. Furthermore, under the environment of 20° C., discharge was performed at 0.2 C up to 3.0 V, and thereby a nonaqueous electrolyte secondary battery was fabricated.

EXAMPLES 2 TO 16

Except for changing the composition of the nonaqueous solvent as shown in the following Tables 1 and 2, similarly to the above Example 1, thin nonaqueous electrolyte secondary batteries are fabricated.

COMPARATIVE EXAMPLES 1 TO 13

Except for changing the composition of the nonaqueous solvent and lithium salt as shown in the following Table 3, similarly to the above Example 1, thin nonaqueous electrolyte secondary batteries are fabricated.

Of the secondary batteries obtained according to Examples 1 to 16 and Comparative examples 1 to 13, battery characteristics are evaluated according to methods explained in the following (1) and (2).

1) Swell of Case at Initial Charge

After the above initial charge, the battery was left for 2 hours under an environment of 20° C. Incidentally, the initial charge was the constant current/constant voltage charge under 45° C. at 0.2 C (104 mA) for 15 hours up to 4.2 V after leaving under the environment of 45° C. for 2 hours. Thereafter, a thickness of the battery was measured. A device used for measuring the thickness of a battery was one of type IDF-130 manufactured by Mitutoyo Corporation, and a weight put on a cell at the measurement was set at 300 g. A swell rate (%) was calculated according to the following equation (I), and obtained results are together shown in Tables 1 to 3.

$$\text{Swell rate } (\%) = (T_1 - T_2)/T_1 \times 100 \quad (I).$$

In the equation (I), $T_1$ is a battery thickness after the initial charge process, and $T_2$ is a battery thickness before the initial charge process.

2) Capacity Maintenance Rate After 200 Cycles Under an Environment of 45° C.

A charge/discharge cycle in which after the 4.2 V constant current/constant voltage charge at a current of 1 C was carried out for 3 hours, discharge was carried out at a current of 1 C up to 3.0 V was repeated under an environment of 45° C., the maximum discharge capacity and the capacity maintenance rate after 200 cycles are measured, and results thereof are together shown in Tables 1 to 3. The capacity maintenance rate after 200 cycles was a value when the discharge capacity at 1 cycle was set 100%.

In Tables 1 to 3, EC denotes ethylene carbonate; GBL denotes γ-butyrolactone; PC denotes propylene carbonate; VEC denotes vinyl ethylene carbonate; VC denotes vinylene carbonate; and EMC denotes ethyl methyl carbonate.

As obvious from Tables 1 to 3, it was found that the secondary batteries according to Examples 1 to 16 where the secondary batteries comprise a liquid nonaqueous electrolyte that contains a nonaqueous solvent in which ratios of EC, PC, GBL, and VEC, respectively, satisfy $15 \leq x \leq 50$, $30 \leq y \leq 75$, $0 < z < 30$, and $0 < p \leq 5$, or a liquid nonaqueous electrolyte that contains a nonaqueous solvent in which ratios of EC, PC, GBL, VC and VEC, respectively, satisfy $15 \leq x \leq 50$, $30 \leq y \leq 75$, $0 < z < 30$, $0 < w \leq 5$ and $0 < q \leq 5$ are small in the swell at the initial charge and high in the capacity maintenance rate after 200 cycles at a high temperature such as 45° C.

Furthermore, from results of Examples 1 to 6, it was found that when the ratio of the GBL is small, the capacity maintenance rate after 200 cycles is higher, on the other hand when the ratio of the GBL is larger the swell at the initial charge becomes smaller. Furthermore, when the composition of the nonaqueous solvent is the same, a secondary battery according to Example 1 in which $LiBF_4$ is used as the electrolyte, in comparison with that according to Example 2 where $LiPF_6$ is used as the electrolyte, can make the swell at the initial charge smaller.

By contrast, the secondary batteries according to Comparative examples 1 to 13 are all smaller in the capacity maintenance rate at 45° C. in comparison with those according to Examples 1 to 16.

Figure 3:
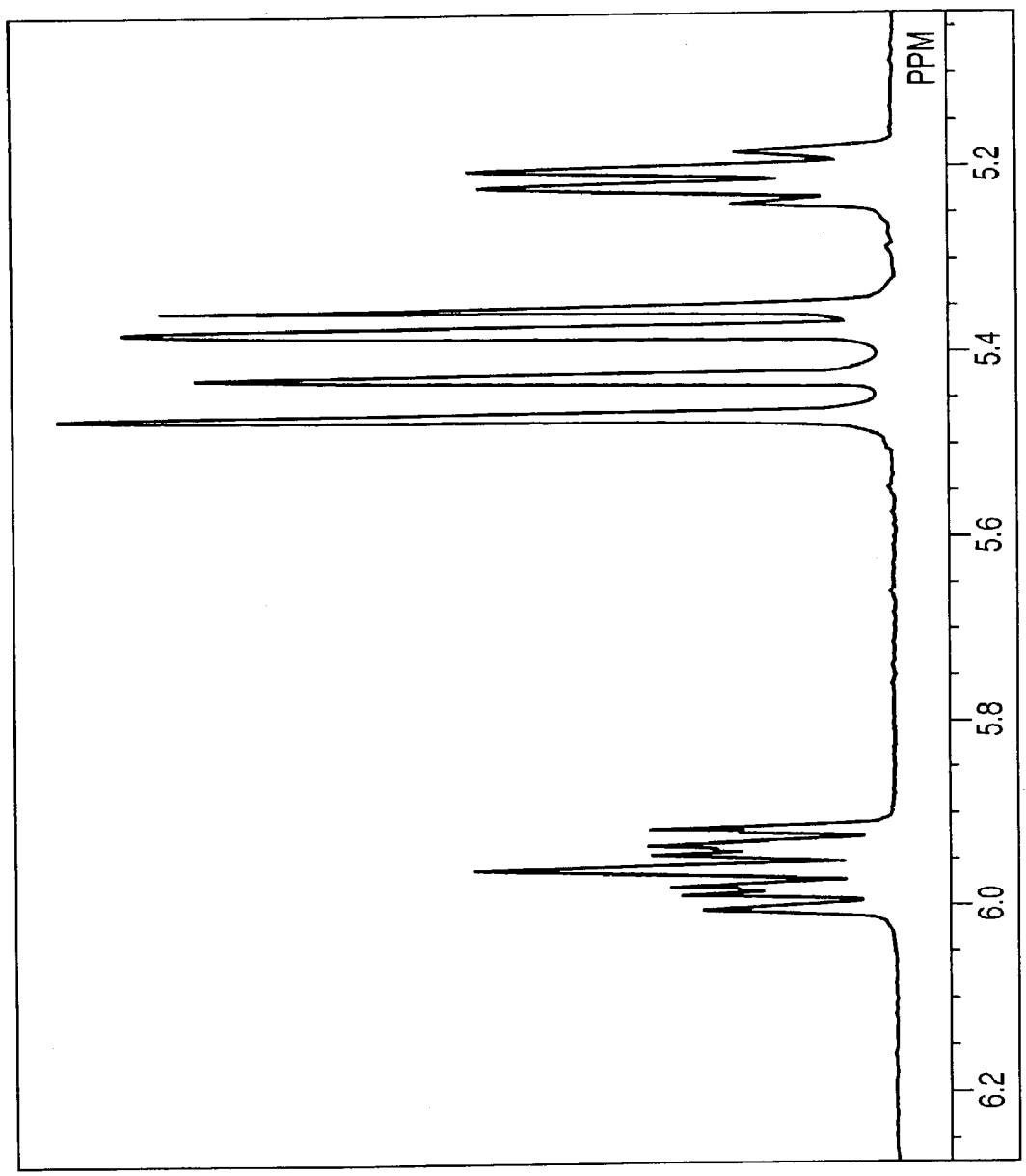
FIG. 3 is a diagram showing a $^1$H NMR spectrum of a liquid nonaqueous electrolyte of the thin nonaqueous electrolyte secondary battery according to Example 1.

Furthermore, with the secondary battery according to Example 1, after the initial charge/discharge, a circuit was opened for 5 hours or more to sufficiently stabilize a potential, thereafter in a glove box of an Ar concentration of 99.9% or more and a dew point of −50° C. or less the secondary battery was decomposed, and the electrode group was taken out. The electrode group was filled in a centrifuge tube, dimethyl sulfoxide (DMSO)-$d_6$ is added thereto followed by hermetically sealing, further followed by taking out of the glove box, still furthermore followed by applying centrifugal separation. Thereafter, in the glove box, a mixture solution of the liquid nonaqueous electrolyte and the DMSO-$d_6$ was collected from the centrifuge tube. Substantially 0.5 ml of the mixture solvent was put in a NMR sample tube having a diameter of 5 mm followed by NMR measurement. Equipment used for the NMR measurement was JNM-LA400WB manufactured by JEOL. Ltd., an observed nucleus was $^1H$, an observed frequency was 400 MHz, and for a primary standard an internal standard of dimethyl sulfoxide (DMSO)-$d_5$ (2.5 ppm) was used. A measurement temperature was set at 25° C. In $^1H$ NMR spectrum, a peak corresponding to EC was observed in the neighborhood of 4.5 ppm, peaks corresponding to VEC are observed in the neighborhood of 5.2, 5.4 and 6 ppm. That is, it was confirmed that the VEC was contained in the nonaqueous solvent present in the secondary battery according to Example 1 after the initial charge/discharge process. Furthermore, when a ratio of an NMR integral intensity of the VEC to an NMR integral intensity of the EC was obtained, it was found that a ratio of the VEC to the nonaqueous solvent total was diminished compared with that of before assembling the secondary battery. For reference purpose, the $^1H$ NMR spectrum of the nonaqueous electrolyte used in Example 1 was shown in FIG. 3.

EXAMPLE 17

<Preparation of Liquid Nonaqueous Electrolyte>

Ethylene carbonate (EC), γ-butyrolactone (GBL), propylene carbonate (PC) and phenyl ethylene carbonate (phEC) are mixed so that the respective volume ratios (EC:GBL:PC:phEC) may be 31:5:62:2, and thereby a nonaqueous solvent was prepared. Lithium tetrafluoro borate ($LiBF_4$) was dissolved in the obtained nonaqueous solvent so that a concentration thereof may be 1.5 mol/L, and thereby a liquid nonaqueous electrolyte was prepared.

Except for the use of such liquid nonaqueous electrolyte, similarly to one explained in the above Example 1, a thin nonaqueous electrolyte secondary battery was fabricated.

EXAMPLES 18 TO 32

Except for changing the composition of the nonaqueous solvent as shown in the following Tables 4 and 5, similarly to Example 1, thin nonaqueous electrolyte secondary batteries are fabricated.

Of the secondary batteries obtained according to Examples 17 to 32, similarly to one explained in Example 1, the maximum discharge capacity, the swell at the initial charge, and the capacity maintenance rate after 200 cycles under a temperature condition of 45° C. are measured, results thereof are shown in Tables 4 and 5. In Tables 4 and 5, phEC denotes phenyl ethylene carbonate.

As obvious from Tables 4 and 5, it was found that the secondary batteries according to Examples 17 to 32 where the secondary batteries comprise a liquid nonaqueous electrolyte containing a nonaqueous solvent in which ratios of EC, PC, GBL, and phEC, respectively, satisfy 15≦x≦50, 30≦y≦75, 0<z<30, and 0<p≦5, or a liquid nonaqueous electrolyte containing a nonaqueous solvent in which ratios of EC, PC, GBL, VC and phEC, respectively, satisfy 15≦x≦50, 30≦y≦75, 0<z<30, 0<w≦5 and 0<q≦5 are small in the swell at the initial charge and high in the capacity maintenance rate after 200 cycles at a high temperature such as 45° C.

Furthermore, when results of Tables 1, 2, 4 and 5 are compared, it was understood that the secondary batteries according to Examples 1 to 16 where VEC is used as the fifth component, in comparison with the secondary batteries according to Examples 17 to 32 where phEC is used as the fifth component, are excellent in the high temperature cycle characteristics.

Furthermore, with the secondary battery according to Example 28, after the initial charge/discharge process, a circuit was opened for 5 hours or more to sufficiently stabilize a potential, thereafter in a glove box of an Ar concentration of 99.9% or more and a dew point of −50° C. or less the secondary battery was decomposed, and the electrode group was taken out. The electrode group was filled in a centrifuge tube, dimethyl sulfoxide (DMSO)-$d_6$ was added thereto followed by hermetically sealing, further followed by taking out of the glove box, still furthermore followed by applying centrifugal separation. Thereafter, in the glove box, a mixture solution of the liquid nonaqueous electrolyte and the DMSO-$d_6$ was collected from the centrifuge tube. Substantially 0.5 ml of the mixture solvent was put into a NMR sample tube having a diameter of 5 mm followed by NMR measurement. Equipment used for the NMR measurement was JNM-LA400WB manufactured by JEOL. Ltd, an observed nucleus was $^1H$, an observed frequency was 400 MHz, and for a primary standard an internal standard of dimethyl sulfoxide (DMSO)-$d_5$ (2.5 ppm) was used. A measurement temperature was set at 25° C. In $^1H$ NMR spectrum, a peak corresponding to EC was observed in the neighborhood of 4.5 ppm, and a peak corresponding to VC was observed in the neighborhood of 7.7 ppm. That is, it was confirmed that the VC was contained in the nonaqueous solvent present in the secondary battery according to Example 28 after the initial charge/discharge process. Furthermore, when a ratio of an NMR integral intensity of the VC to an NMR integral intensity of the EC was obtained, it was found that a ratio of the VC to the nonaqueous solvent total was diminished in compared with that of before assembling the secondary battery.

EXAMPLE 33

<Preparation of Nonaqueous Electrolyte>

Ethylene carbonate (EC), γ-butyrolactone (GBL), propylene carbonate (PC) and vinyl ethylene carbonate (VEC) are mixed so that the respective volume ratios (EC:GBL:PC: VEC) may be 31:6:62:1, and thereby a nonaqueous solvent was prepared. Lithium tetrafluoro borate ($LiBF_4$) was dissolved in the obtained nonaqueous solvent so that a concentration thereof may be 1.5 mol/L, and thereby a liquid nonaqueous electrolyte was prepared. The liquid nonaqueous electrolyte and a solution obtained by dissolving polyvinylidene fluoride hexafluoropropylene (PVdF-HEP) in tetrahydroxyfuran (THF) are mixed, and thereby paste was prepared. The obtained paste was coated on a substrate followed by drying, and thereby a thin film was obtained.

<Preparation of Electrode Group>

After a ribbon-like positive electrode lead was welded to the current collector of the positive electrode similar to one that was explained in the above Example 1 and a ribbon-like negative electrode lead was welded to the current collector of the negative electrode similar to one explained in the above Example 1, the positive electrode and the negative electrode are spirally wound with the separator interposed therebetween followed by forming into a flat shape, and thereby an electrode group was prepared.

The electrode group was immersed in the liquid nonaqueous electrolyte and the film was plasticized under a reduced pressure, and thereby an electrode group comprising an electrolyte layer interposed between the positive electrode and the negative electrode was obtained.

A 100 μm thick laminate film that was formed by covering both surfaces of an aluminum foil with polypropylene was formed pouch-like, the electrode group was accommodated therein, and thereby a thin nonaqueous electrolyte secondary battery having a thickness of 3.6 mm, a width of 35 mm and a height of 62 mm was assembled.

To the nonaqueous electrolyte secondary battery, as the initial charge/discharge process, the following processes are applied. First, after leaving under a high temperature environment of 45° C. for 2 hours, under the environment, a constant current/constant voltage charge was carried out at 0.2 C (84 mA) up to 4.2 V for 15 hours. Thereafter, it was left at 20° C. over 7 days. Furthermore, under an environment of 20° C., discharge was performed at 0.2 C up to 3.0 V, and thereby a nonaqueous electrolyte secondary battery was fabricated.

EXAMPLES 34 TO 40

Except for changing the composition of the nonaqueous solvent of the gel-like nonaqueous electrolyte as shown in the following Table 6, similarly to Example 33 described above, thin nonaqueous electrolyte secondary batteries are fabricated.

COMPARATIVE EXAMPLES 14 TO 26

Except for changing the composition of the nonaqueous solvent and lithium salt as shown in the following Table 7, similarly to Example 33 described above, thin nonaqueous electrolyte secondary batteries are fabricated.

Of the secondary batteries obtained according to Examples 33 to 40 and Comparative examples 14 to 26, battery characteristics are evaluated according to methods explained in the following (1) and (2).

1) Swell of Case at Initial Charge

After the above initial charge process, the battery was left for 2 hours under an environment of 20° C. Incidentally, the initial charge was the constant current/constant voltage charge under 45° C. at 0.2 C (84 mA) for 15 hours up to 4.2 V after leaving under the environment of 45° C. for 2 hours. Thereafter, a thickness of the battery was measured. A swell rate (%) was calculated according to the above-mentioned equation (I) and obtained results are together shown in Tables 6 and 7. The equipment used for measuring the thickness of the battery and the weight put on the cell at the measurement are similar to those explained in the above Example 1.

2) Capacity Maintenance Rate After 200 Cycles Under an Environment of 45° C.

A charge/discharge cycle in which after the 4.2 V constant current/constant voltage charge at a current of 1 C was carried out for 3 hours, discharge was carried out at a current of 1 C up to 3.0 V was repeated under a temperature of 45° C., the maximum discharge capacity and the capacity maintenance rate after 200 cycles are measured, and results thereof are together shown in Tables 6 and 7. The capacity maintenance rate after 200 cycles was a value when the discharge capacity at 1 cycle was set at 100%.

As obvious from Tables 6 and 7, it was found that the secondary batteries according to Examples 33 to 40 where the secondary batteries comprise a gel-like nonaqueous electrolyte that contains a nonaqueous solvent in which ratios of EC, PC, GBL and the fourth component, respectively, satisfy $15 \leq x \leq 50$, $30 \leq y \leq 75$, $0<z<30$, and $0<p \leq 5$, or a gel-like nonaqueous electrolyte that contains a nonaqueous solvent in which ratios of EC, PC, GBL, VC and the fifth component, respectively, satisfy $15 \leq x \leq 50$, $30 \leq y \leq 75$, $0<z<30$, $0<w \leq 5$ and $0<q \leq 5$ are small in the swell at the initial charge and high in the capacity maintenance rate after 200 cycles at a high temperature such as 45° C. In particular, the secondary batteries according to Examples 37 and 38 are excellent in the capacity maintenance rate. Furthermore, when results of Examples 33, 35, 37, and 39 are compared, it was found that the cycle life at high temperatures becomes higher in the order of Example 35 (phEC)<Example 39 (VC+phEC)<Example 33 (VEC)<Example 37 (VC+VEC).

On the other hand, the secondary batteries according to Comparative examples 14 to 26 all are lower in the capacity maintenance rate at 45° C. than those according to Examples 33 to 40.

EXAMPLE 41

<Preparation of Liquid Nonaqueous Electrolyte>

In a nonaqueous solvent having a composition similar to that explained in the above Example 1, lithium tetrafluoro borate (LiBF$_4$) as a first electrolyte was dissolved so that its concentration may be 1.5 mol/L, and LiN(C$_2$F$_5$SO$_2$)$_2$ as a second electrolyte was dissolved so that its concentration may be 0.2 mol/L, and thereby a liquid nonaqueous electrolyte was prepared.

Except for the use of a liquid nonaqueous electrolyte like this, similarly to Example 1 described above, a thin nonaqueous electrolyte secondary battery was fabricated.

EXAMPLE 42

<Preparation of Liquid Nonaqueous Electrolyte>

In a nonaqueous solvent having a composition similar to that explained in the above Example 17, lithium tetrafluoro borate (LiBF$_4$) as a first electrolyte was dissolved so that its concentration may be 1.5 mol/L, and LiN(C$_2$F$_5$SO$_2$)$_2$ as a second electrolyte was dissolved so that its concentration may be 0.2 mol/L, and thereby a liquid nonaqueous electrolyte was prepared.

Except for the use of a liquid nonaqueous electrolyte like this, similarly to Example 1 described above, a thin nonaqueous electrolyte secondary battery was fabricated.

EXAMPLE 45

<Preparation of Liquid Nonaqueous Electrolyte>

In a nonaqueous solvent having a composition similar to that explained in the above Example 12, lithium tetrafluoro borate (LiBF$_4$) as a first electrolyte was dissolved so that its concentration may be 1.5 mol/L, and LiN(C$_2$F$_5$SO$_2$)$_2$ as a second electrolyte was dissolved so that its concentration may be 0.2 mol/L, and thereby a liquid nonaqueous electrolyte was prepared.

Except for the use of a liquid nonaqueous electrolyte like this, similarly to Example 1 described above, a thin nonaqueous electrolyte secondary battery was fabricated.

EXAMPLE 46

<Preparation of Liquid Nonaqueous Electrolyte>

In a nonaqueous solvent having a composition similar to one explained in the above Example 13, LiPF$_6$ as a first electrolyte was dissolved so that its concentration may be 1 mol/L, and LiBF$_4$ as a second electrolyte was dissolved so that its concentration may be 0.2 mol/L, and thereby a liquid nonaqueous electrolyte was prepared.

Except for the use of a liquid nonaqueous electrolyte like this, similarly to Example 1 described above, a thin nonaqueous electrolyte secondary battery was fabricated.

EXAMPLE 47

<Preparation of Liquid Nonaqueous Electrolyte>

In a nonaqueous solvent having a composition similar to one explained in the above Example 28, lithium tetrafluoro borate (LiBF$_4$) as a first electrolyte was dissolved so that its concentration may be 1.5 mol/L, and LiN(C$_2$F$_5$SO$_2$)$_2$ as a second electrolyte was dissolved so that its concentration may be 0.2 mol/L, and thereby a liquid nonaqueous electrolyte was prepared.

Except for the use of a liquid nonaqueous electrolyte like this, similarly to Example 1 described above, a thin nonaqueous electrolyte secondary battery was fabricated.

EXAMPLE 48

<Preparation of Liquid Nonaqueous Electrolyte>

In a nonaqueous solvent having a composition similar to that explained in the above Example 29, LiPF$_6$ as a first electrolyte was dissolved so that its concentration may be 1 mol/L, and LiBF$_4$ as a second electrolyte was dissolved so that its concentration may be 0.2 mol/L, and thereby a liquid nonaqueous electrolyte was prepared.

Except for the use of a liquid nonaqueous electrolyte like this, similarly to Example 1 described above, a thin nonaqueous electrolyte secondary battery was fabricated.

Of the secondary batteries obtained according to Examples 41, 42 and 45 to 48, similarly to Example 1 explained above, the maximum discharge capacity, the swell at the initial charge, and the capacity maintenance rate after 200 cycles under a 45° C. environment are measured, and results thereof are shown in Tables 8 and 9. In Table 8, results of the aforementioned Examples 1, 12, 13, 17, 28 and 29 are shown together.

As obvious from Table 8, it was found that from comparison between Example 41 and Example 1, and between Example 45 and Example 12, when a mixed salt of LiBF$_4$ and LiN(C$_2$F$_5$SO$_2$)$_2$ was used as the electrolyte, in comparison with the case where only LiBF$_4$ was used as the electrolyte, the capacity maintenance rate after 200 cycles at a high temperature such as 45° C. can be made higher. Furthermore, when Example 46 was compared with Example 13, it was understood that Example 46 where a mixed salt of LiPF$_6$ and LiBF$_4$ was used, in comparison with Example 13 where only LiPF$_6$ was used as the electrolyte, can make the capacity maintenance rate after 200 cycles at higher temperatures higher.

On the other hand, as shown in Table 9, it was understood that even when phEC was used as an additive, the secondary batteries according to Examples 42 and 47 where a mixed salt of LiBF$_4$ and LiN(C$_2$F$_5$SO$_2$)$_2$ was used, in comparison with the secondary batteries according to Examples 17 and 28 where only LiBF$_4$ was used as the electrolyte, are higher in the capacity maintenance rate after 200 cycles at higher temperatures. Furthermore, when Example 48 and Example 29 are compared, it was found that the secondary battery according to Example 48 where a mixed salt of LiPF$_6$ and LiBF$_4$ is used, in comparison with the secondary battery according to Example 29 where only LiPF$_6$ is used as the electrolyte, can make the capacity maintenance rate after 200 cycles at higher temperatures higher.

Furthermore, among the cases where the mixed salt is used, the secondary battery according to Example 45 is the highest in the capacity maintenance rate.

EXAMPLES 43, 44, 49 AND 50

Except for changing the composition of the nonaqueous solvent as shown in the following Table 10, similarly to Example 1, thin nonaqueous electrolyte secondary batteries are fabricated.

Of the secondary batteries obtained according to Examples 43, 44, 49 and 50, similarly to Example 1 explained above, the maximum discharge capacity, the swell at the initial charge, and the capacity maintenance rate after 200 cycles under a 45° C. environment are measured, and results thereof are shown in Table 10. In Table 10, results of the aforementioned Examples 1, 12, 17, and 28 are shown together.

As obvious from Table 10, it was found that the secondary batteries according to Examples 43 and 44 where the fourth component that contains VEC or phEC and a solvent other than VEC and phEC is used, in comparison with the secondary batteries according to Examples 1 and 17 where only VEC or phEC is used as the fourth component, are higher in the capacity maintenance rate after 200 cycles at a high temperature such as 45° C.

Furthermore, it was found that the secondary batteries according to Examples 49 and 50 where the fifth component that contains the VEC or phEC and a solvent other than VEC and phEC is used, in comparison with the secondary batteries according to Examples 12 and 28 where only VEC or phEC is used as the fifth component, are higher in the capacity maintenance rate after 200 cycles at a high temperature such as 45° C.

Among Examples 43, 44, 49 and 50, the secondary battery according to Example 49 where EC, PC, GBL, VC, VEC and an additive component such as DEC are used is the highest in the capacity maintenance rate after 200 cycles at higher temperatures.

(Evaluation of Low Temperature Discharge Characteristics)

Of the secondary batteries according to Examples 1, 2, and 12 to 16, the 4.2 V constant current/constant voltage charge was performed at a current of 1 C for 3 hours followed by leaving at −10° C. for 1 hour, further followed by discharging, under a low temperature environment of −10° C., under the conditions of a discharge rate of 1 C and a discharge final voltage of 3.0 V, and the discharge capacity was measured. Obtained low temperature discharge capacity was expressed with a discharge capacity when the discharge was carried out under the same conditions at room temperature 100%, results thereof are shown as a −10° C. discharge capacity maintenance rate in the following Table 11.

As obvious from Table 11, it was understood that the secondary batteries according to Examples 12 to 16 that comprise the nonaqueous solvent containing EC, GBL, PC, VC and VEC, in comparison with the secondary batteries according to Examples 1 and 2 that comprise the nonaqueous solvent that does not contain VC, are higher in the discharge capacity at a low temperature such as −10° C. Furthermore, when Examples 12, and 14 to 16 are compared, it was found that when an addition amount of VC is in the range of 0.05 to 2% by volume, the low temperature capacity maintenance rate such high as exceeding 60% can be obtained.

EXAMPLES 51 TO 54

Except for changing the composition of the nonaqueous solvent as shown in the following Table 12, similarly to Example 1 described above, thin nonaqueous electrolyte secondary batteries are fabricated.

Of the secondary batteries obtained according to Examples 51 to 54, similarly to Example 1 explained above, the maximum discharge capacity, the swell at the initial charge, and the capacity maintenance rate after 200 cycles under a 45° C. environment are measured, in addition, the low temperature discharge capacity was measured in the method similar to that described above, and results thereof are shown in the following Table 12.

As obvious from Table 12, when Examples 4, and 7 to 9, and Examples 51 to 54 are compared, it was found that when VC is added to a solvent made of four components of EC, GBL, PC and VEC, the secondary batteries in which the swell rate at the initial charge is low, the cycle life at higher temperatures is long and the low temperature discharge characteristics are excellent can be obtained. Among Examples 51 to 54, the secondary batteries according to Examples 51 to 53 in which a ratio (r) of VEC is in the range of 0.05 to 3% by volume, in comparison with the secondary battery according to Example 54 in which the ratio of VEC exceeds 3% by volume, are excellent in the low temperature discharge characteristics.

TABLE 1

(VEC, Liquid nonaqueous electrolyte)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Example 1 | 31% EC, 6% GBL, 62% PC, 1% VEC | $LiBF_4$ | 1.5 | 0.52 | 16 | 81 |
| Example 2 | 31% EC, 6% GBL, 62% PC, 1% VEC | $LiPF_6$ | 1.0 | 0.52 | 17 | 80 |
| Example 3 | 29% EC, 12% GBL, 58% PC, 1% VEC | $LiBF_4$ | 1.5 | 0.52 | 15 | 78 |
| Example 4 | 27% EC, 18% GBL, 54% PC, 1% VEC | $LiBF_4$ | 1.5 | 0.52 | 15 | 75 |
| Example 5 | 25% EC, 24% GBL, 50% PC, 1% VEC | $LiBF_4$ | 1.5 | 0.52 | 12 | 72 |
| Example 6 | 23% EC, 29% GBL, 47% PC, 1% VEC | $LiBF_4$ | 1.5 | 0.52 | 11 | 70 |
| Example 7 | 27% EC, 18% GBL, 53% PC, 2% VEC | $LiBF_4$ | 1.5 | 0.52 | 12 | 79 |
| Example 8 | 26% EC, 18% GBL, 53% PC, 3% VEC | $LiBF_4$ | 1.5 | 0.52 | 10 | 78 |
| Example 9 | 25% EC, 18% GBL, 52% PC, 5% VEC | $LiBF_4$ | 1.5 | 0.51 | 9 | 76 |

TABLE 2

(VEC, Liquid nonaqueous electrolyte)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Example 10 | 46% EC, 18% GBL, 35% PC, 1% VEC | $LiBF_4$ | 1.5 | 0.52 | 13 | 76 |
| Example 11 | 22% EC, 6% GBL, 71% PC, 1% VEC | $LiBF_4$ | 1.5 | 0.51 | 21 | 78 |
| Example 12 | 31% EC, 5% GBL, 62% PC, 1% VC, 1% VEC | $LiBF_4$ | 1.5 | 0.52 | 17 | 82 |
| Example 13 | 31% EC, 5% GBL, 62% PC, 1% VC, 1% VEC | $LiPF_6$ | 1.0 | 0.52 | 18 | 81 |
| Example 14 | 31% EC, 5% GBL, 60% PC, 3% VC, 1% VEC | $LiBF_4$ | 1.5 | 0.52 | 21 | 84 |
| Example 15 | 30% EC, 5% GBL, 59% PC, 5% VC, 1% VEC | $LiBF_4$ | 1.5 | 0.51 | 22 | 80 |
| Example 16 | 31.5% EC, 5% GBL, 62% PC, 0.5% VC, 1% VEC | $LiBF_4$ | 1.5 | 0.52 | 16 | 80 |

TABLE 3

(VEC, Liquid nonaqueous electrolyte)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Comparative example 1 | 100% BL | $LiBF_4$ | 1.5 | 0.30 | 13 | 0.1 |
| Comparative example 2 | 100% PC | $LiPF_6$ | 1.5 | 0.10 | 77 | 0.1 |
| Comparative example 3 | 25% EC, 50% BL, 25% EMC | $LiBF_4$ | 1.5 | 0.30 | 21 | 0.1 |
| Comparative example 4 | 75% EC, 25% BL | $LiBF_4$ | 1.5 | 0.40 | 11 | 0.1 |

TABLE 3-continued (VEC, Liquid nonaqueous electrolyte)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Comparative example 5 | 25% EC, 75% EMC | LiPF$_6$ | 1.5 | 0.52 | 24 | 0.1 |
| Comparative example 6 | 50% EC, 50% PC | LiPF$_6$ | 1.0 | 0.15 | 74 | 0.1 |
| Comparative example 7 | 50% EC, 50% PC | LiBF$_4$ | 1.5 | 0.15 | 71 | 0.1 |
| Comparative example 8 | 50% EC, 48% PC, 2% VC | LiPF$_6$ | 1.0 | 0.35 | 39 | 10 |
| Comparative example 9 | 50% EC, 48% PC, 2% VEC | LiPF$_6$ | 1.0 | 0.37 | 29 | 15 |
| Comparative example 10 | 35% EC, 45% BL, 20% PC | LiBF$_4$ | 1.5 | 0.48 | 15 | 0.1 |
| Comparative example 11 | 35% EC, 45% BL, 18% PC, VC 2% | LiBF$_4$ | 1.5 | 0.52 | 17 | 58 |
| Comparative example 12 | 35% EC, 20% BL, 45% PC | LiBF$_4$ | 1.5 | 0.40 | 20 | 15 |
| Comparative example 13 | 33% EC, 66% BL, 1% VC | LiBF$_4$ | 1.5 | 0.52 | 15 | 10 |

TABLE 4

(phEC, Liquid nonaqueous electrolyte)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Example 17 | 31% EC, 5% GBL, 62% PC, 2% phEC | LiBF$_4$ | 1.5 | 0.52 | 13 | 72 |
| Example 18 | 31% EC, 5% GBL, 62% PC, 2% phEC | LiPF$_6$ | 1.0 | 0.52 | 14 | 73 |
| Example 19 | 29% EC, 11% GBL, 58% PC, 2% phEC | LiBF$_4$ | 1.5 | 0.52 | 14 | 70 |
| Example 20 | 27% EC, 17% GBL, 54% PC, 2% phEC | LiBF$_4$ | 1.5 | 0.52 | 13 | 67 |
| Example 21 | 25% EC, 23% GBL, 50% PC, 2% phEC | LiBF$_4$ | 1.5 | 0.52 | 10 | 65 |
| Example 22 | 23% EC, 29% GBL, 46% PC, 2% phEC | LiBF$_4$ | 1.5 | 0.52 | 9 | 63 |
| Example 23 | 27% EC, 17% GBL, 53% PC, 3% phEC | LiBF$_4$ | 1.5 | 0.52 | 10 | 66 |
| Example 24 | 26% EC, 17% GBL, 53% PC, 4% phEC | LiBF$_4$ | 1.5 | 0.52 | 9 | 63 |
| Example 25 | 26% EC, 17% GBL, 52% PC, 5% phEC | LiBF$_4$ | 1.5 | 0.52 | 9 | 61 |

TABLE 5

(phEC, Liquid nonaqueous electrolyte)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Example 26 | 46% EC, 17% GBL, 35% PC, 2% phEC | LiBF$_4$ | 1.5 | 0.52 | 9 | 63 |
| Example 27 | 22% EC, 5% GBL, 71% PC, 2% phEC | LiBF$_4$ | 1.5 | 0.51 | 19 | 65 |
| Example 28 | 30% EC, 5% GBL, 62% PC, 1% VC, 2% phEC | LiBF$_4$ | 1.5 | 0.52 | 15 | 74 |

TABLE 5-continued (phEC, Liquid nonaqueous electrolyte)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Example 29 | 30% EC, 5% GBL, 62% PC, 1% VC, 2% phEC | $LiPF_6$ | 1.0 | 0.52 | 15 | 75 |
| Example 30 | 30% EC, 5% GBL, 60% PC, 3% VC, 2% phEC | $LiBF_4$ | 1.5 | 0.52 | 18 | 77 |
| Example 31 | 29% EC, 5% GBL, 59% PC, 5% VC, 2% phEC | $LiBF_4$ | 1.5 | 0.51 | 20 | 74 |
| Example 32 | 30.5% EC, 5% GBL, 62% PC, 0.5% VC, 2% phEC | $LiBF_4$ | 1.5 | 0.52 | 15 | 72 |

TABLE 6

(Gel-like nonaqueous electrolyte)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Example 33 | 31% EC, 6% GBL, 62% PC, 1% VEC | $LiBF_4$ | 1.5 | 0.42 | 13 | 81 |
| Example 34 | 27% EC, 18% GBL, 54% PC, 1% VEC | $LiBF_4$ | 1.5 | 0.42 | 12 | 76 |
| Example 35 | 31% EC, 5% GBL, 62% PC, 2% phEC | $LiBF_4$ | 1.5 | 0.42 | 10 | 73 |
| Example 36 | 27% EC, 17% GBL, 54% PC, 2% phEC | $LiBF_4$ | 1.5 | 0.42 | 10 | 69 |
| Example 37 | 31% EC, 5% GBL, 62% PC, 1% VC, 1% VEC | $LiBF_4$ | 1.5 | 0.42 | 15 | 83 |
| Example 38 | 31% EC, 5% GBL, 60% PC, 3% VC, 1% VEC | $LiBF_4$ | 1.5 | 0.42 | 20 | 84 |
| Example 39 | 30% EC, 5% GBL, 62% PC, 1% VC, 2% phEC | $LiBF_4$ | 1.5 | 0.42 | 13 | 74 |
| Example 40 | 30% EC, 5% GBL, 60% PC, 3% VC, 2% phEC | $LiBF_4$ | 1.5 | 0.42 | 15 | 78 |

TABLE 7

(Gel-like nonaqueous electrolyte)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Comparative example 14 | 100% BL | $LiBF_4$ | 1.5 | 0.20 | 13 | 0.1 |
| Comparative example 15 | 100% PC | $LiPF_6$ | 1.5 | 0.10 | 60 | 0.1 |
| Comparative example 16 | 25% EC, 50% BL, 25% EMC | $LiBF_4$ | 1.5 | 0.20 | 18 | 0.1 |
| Comparative example 17 | 75% EC, 25% BL | $LiBF_4$ | 1.5 | 0.30 | 11 | 0.1 |
| Comparative example 18 | 25% EC, 75% EMC | $LiPF_6$ | 1.5 | 0.42 | 22 | 0.1 |
| Comparative example 19 | 50% EC, 50% PC | $LiPF_6$ | 1.0 | 0.15 | 58 | 0.1 |

TABLE 7-continued (Gel-like nonaqueous electrolyte)

|  | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Comparative example 20 | 50% EC, 50% PC | LiBF$_4$ | 1.5 | 0.15 | 55 | 0.1 |
| Comparative example 21 | 50% EC, 48% PC, 2% VC | LiPF$_6$ | 1.0 | 0.25 | 35 | 15 |
| Comparative example 22 | 50% EC, 48% PC, 2% VEC | LiPF$_6$ | 1.0 | 0.30 | 25 | 20 |
| Comparative example 23 | 35% EC, 45% BL, 20% PC | LiBF$_4$ | 1.5 | 0.40 | 13 | 0.1 |
| Comparative example 24 | 35% EC, 45% BL, 18% PC, VC 2% | LiBF$_4$ | 1.5 | 0.42 | 16 | 60 |
| Comparative example 25 | 35% EC, 20% BL, 45% PC | LiBF$_4$ | 1.5 | 0.38 | 18 | 20 |
| Comparative example 26 | 33% EC, 66% BL, 1% VC | LiBF$_4$ | 1.5 | 0.42 | 14 | 15 |

TABLE 8

(Lithium salts)

|  | Composition of nonaqueous solvent (volume %) | First electrolyte | Concentration of first electrolyte (mol/L) | Second electrolyte | Concentration of second electrolyte (mol/L) | Maximum discharge capacity (Ah) | Swell at initial charge (%) | Capacity maintenance rate after 200 cycles under 45° C. environment (%) |
|---|---|---|---|---|---|---|---|---|
| Example 41 | 31% EC, 6% GBL, 62% PC, 1% VEC | LiBF$_4$ | 1.5 | LiN(C$_2$F$_5$SO$_2$)$_2$ | 0.2 | 0.52 | 15 | 83 |
| Example 1 | 31% EC, 6% GBL, 62% PC, 1% VEC | LiBF$_4$ | 1.5 | No addition | — | 0.52 | 16 | 81 |
| Example 45 | 31% EC, 5% GBL, 62% PC, 1% VC, 1% VEC | LiBF$_4$ | 1.5 | LiN(C$_2$F$_5$SO$_2$)$_2$ | 0.2 | 0.52 | 16 | 84 |
| Example 12 | 31% EC, 5% GBL, 62% PC, 1% VC, 1% VEC | LiBF$_4$ | 1.5 | No addition | — | 0.52 | 17 | 82 |
| Example 46 | 31% EC, 5% GBL, 62% PC, 1% VC, 1% VEC | LiPF$_6$ | 1.0 | LiBF$_4$ | 0.2 | 0.52 | 18 | 83 |
| Example 13 | 31% EC, 5% GBL, 62% PC, 1% VC, 1% VEC | LiPF$_6$ | 1.0 | No addition | — | 0.52 | 18 | 81 |

TABLE 9

(Lithium salts)

|  | Composition of nonaqueous solvent (volume %) | First electrolyte | Concentration of first electrolyte (mol/L) | Second electrolyte | Concentration of second electrolyte (mol/L) | Maximum discharge capacity (Ah) | Swell at initial charge (%) | Capacity maintenance rate after 200 cycles under 45° C. environment (%) |
|---|---|---|---|---|---|---|---|---|
| Example 42 | 31% EC, 5% GBL, 62% PC, 2% phEC | LiBF$_4$ | 1.5 | LiN(C$_2$F$_5$SO$_2$)$_2$ | 0.2 | 0.52 | 13 | 75 |
| Example 17 | 31% EC, 5% GBL, 62% PC, 2% phEC | LiBF$_4$ | 1.5 | No addition | — | 0.52 | 14 | 72 |
| Example 47 | 30% EC, 5% GBL, 62% PC, 1% VC, 2% phEC | LiBF$_4$ | 1.5 | LiN(C$_2$F$_5$SO$_2$)$_2$ | 0.2 | 0.52 | 14 | 76 |
| Example 28 | 30% EC, 5% GBL, 62% PC, 1% VC, 2% phEC | LiBF$_4$ | 1.5 | No addition | — | 0.52 | 15 | 74 |
| Example 48 | 30% EC, 5% GBL, 62% PC, 1% VC, 2% phEC | LiPF$_6$ | 1.0 | LiBF$_4$ | 0.2 | 0.52 | 15 | 79 |
| Example 29 | 30% EC, 5% GBL, 62% PC, 1% VC, 2% phEC | LiPF$_6$ | 1.0 | No addition | — | 0.52 | 15 | 75 |

TABLE 10

(Mixed system)

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) |
|---|---|---|---|---|---|---|
| Example 43 | 31% EC, 6% GBL, 61% PC, 1% VEC, 1% DEC | LiBF$_4$ | 1.5 | 0.52 | 17 | 83 |
| Example 1 | 31% EC, 6% GBL, 62% PC, 1% VEC | LiBF$_4$ | 1.5 | 0.52 | 16 | 81 |
| Example 44 | 31% EC, 5% GBL, 61% PC, 2% phEC, 1% DEC | LiBF$_4$ | 1.5 | 0.52 | 14 | 74 |
| Example 17 | 31% EC, 5% GBL, 62% PC, 2% phEC | LiBF$_4$ | 1.5 | 0.52 | 14 | 72 |
| Example 49 | 31% EC, 5% GBL, 61% PC, 1% VC, 1% VEC, 1% DEC | LiBF$_4$ | 1.5 | 0.52 | 18 | 84 |
| Example 12 | 31% EC, 5% GBL, 62% PC, 1% VC, 1% VEC | LiBF$_4$ | 1.5 | 0.52 | 17 | 82 |
| Example 50 | 30% EC, 5% GBL, 61% PC, 1% VC, 2% phEC, 1% DEC | LiBF$_4$ | 1.5 | 0.52 | 17 | 77 |
| Example 28 | 30% EC, 5% GBL, 62% PC, 1% VC, 2% phEC | LiBF$_4$ | 1.5 | 0.52 | 15 | 74 |

TABLE 11

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) | Discharge capacity maintenance rate at −10° C. (%) |
|---|---|---|---|---|---|---|---|
| Example 1 | 31% EC, 6% GBL, 62% PC, 1% VEC | LiBF$_4$ | 1.5 | 0.52 | 16 | 81 | 40 |
| Example 2 | 31% EC, 6% GBL, 62% PC, 1% VEC | LiPF$_6$ | 1.0 | 0.52 | 17 | 80 | 40 |
| Example 12 | 31% EC, 5% GBL, 62% PC, 1% VC, 1% VEC | LiBF$_4$ | 1.5 | 0.52 | 17 | 82 | 64 |
| Example 13 | 31% EC, 5% GBL, 62% PC, 1% VC, 1% VEC | LiPF$_6$ | 1.0 | 0.52 | 18 | 81 | 64 |
| Example 14 | 31% EC, 5% GBL, 60% PC, 3% VC, 1% VEC | LiBF$_4$ | 1.5 | 0.52 | 21 | 84 | 57 |
| Example 15 | 30% EC, 5% GBL, 59% PC, 5% VC, 1% VEC | LiBF$_4$ | 1.5 | 0.51 | 22 | 80 | 53 |
| Example 16 | 31.5% EC, 5% GBL, 62% PC, 0.5% VC, 1% VEC | LiBF$_4$ | 1.5 | 0.52 | 16 | 80 | 68 |

TABLE 12

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) | Discharge capacity maintenance rate at −10° C. (%) |
|---|---|---|---|---|---|---|---|
| Example 4 | 27% EC, 18% GBL, 54% PC, 1% VEC | LiBF$_4$ | 1.5 | 0.52 | 15 | 75 | 45 |
| Example 7 | 27% EC, 18% GBL, 53% PC, 2% VEC | LiBF$_4$ | 1.5 | 0.52 | 12 | 79 | 40 |
| Example 8 | 26% EC, 18% GBL, 53% PC, 3% VEC | LiBF$_4$ | 1.5 | 0.52 | 10 | 78 | 36 |
| Example 9 | 25% EC, 18% GBL, 52% PC, 5% VEC | LiBF$_4$ | 1.5 | 0.51 | 9 | 76 | 25 |
| Example 51 | 27% EC, 18% GBL, 53% PC, 1% VC, 1% VEC | LiBF$_4$ | 1.5 | 0.52 | 16 | 78 | 72 |
| Example 52 | 27% EC, 18% GBL, 52% PC, 1% VC, 2% VEC | LiBF$_4$ | 1.5 | 0.52 | 12 | 82 | 64 |

TABLE 12-continued

| | Composition of nonaqueous solvent (volume %) | Electrolyte | Concentration of electrolyte (mol/L) | Maximum discharge capacity (Ah) | Swell at initial charge (%) | Capacity maintenance rate after 200 cycles under 45° C. environment (%) | Discharge capacity maintenance rate at −10° C. (%) |
|---|---|---|---|---|---|---|---|
| Example 53 | 26% EC, 18% GBL, 52% PC, 1% VC, 3% VEC | LiBF$_4$ | 1.5 | 0.52 | 11 | 81 | 55 |
| Example 54 | 25% EC, 18% GBL, 51% PC, 1% VC, 5% VEC | LiBF$_4$ | 1.5 | 0.51 | 10 | 78 | 50 |

As mentioned above, according to the present invention, a nonaqueous electrolyte capable of improving the charge/discharge cycle life at high temperatures, and a nonaqueous electrolyte secondary battery comprising the nonaqueous electrolyte can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising:
   a case;
   an electrode group comprising a positive electrode, and a negative electrode which is provided in the case; and
   a nonaqueous electrolyte which is provided in the case and comprises a nonaqueous solvent,
   wherein the nonaqueous solvent comprises ethylene carbonate (EC), propylene carbonate (PC), γ-butyrolactone (GBL), vinylene carbonate (VC) and a fifth component that comprises vinyl ethylene carbonate and/or phenyl ethylene carbonate and the nonaqueous solvent satisfies the following relationships (5) to (9):

$$15 \leq x \leq 50 \quad (5)$$

$$30 \leq y \leq 75 \quad (6)$$

$$0 < z \leq 25 \quad (7)$$

$$0 < w \leq 5 \quad (8)$$

$$0 < q \leq 5 \quad (9)$$

where, x is the ratio (volume %) of ethylene carbonate to the total volume of the nonaqueous solvent, y is the ratio (volume %) of propylene carbonate to the total volume of the nonaqueous solvent, z is the ratio (volume %) of γ-butyrolactone to the total volume of the nonaqueous solvent, w is the ratio (volume %) of vinylene carbonate to the total volume of the nonaqueous solvent, and q is the ratio (volume %) of the fifth component to the total volume of the nonaqueous solvent.

2. A nonaqueous electrolyte secondary battery according to claim 1,
   wherein the nonaqueous electrolyte substantially has a liquid or gel form.

3. A nonaqueous electrolyte secondary battery according to claim 1,
   wherein the fifth component comprises vinyl ethylene carbonate.

4. A nonaqueous electrolyte secondary battery according to claim 1,
   wherein the fifth component comprises vinyl ethylene carbonate and the ratio of vinyl ethylene carbonate to the total volume of the nonaqueous solvent is in the range of 3% by volume or less.

5. A nonaqueous electrolyte secondary battery according to claim 1,
   wherein the fifth component comprises vinyl ethylene carbonate and the ratio of vinyl ethylene carbonate to the total volume of the nonaqueous solvent is in the range of 0.05 to 2% by volume.

6. A nonaqueous electrolyte secondary battery according to claim 5,
   wherein w further satisfies $0 < w \leq 3$.

7. A nonaqueous electrolyte secondary battery according to claim 1,
   wherein the fifth component comprises vinyl ethylene carbonate, and the nonaqueous solvent further satisfies the following relationships (10) and (11):

$$0 < r + w \leq 6 \quad (10)$$

$$0.05 \leq r \leq 2 \quad (11)$$

where, w is the ratio (volume %) of vinylene carbonate to the total volume of the nonaqueous solvent, and r is the ratio (volume %) of vinyl ethylene carbonate to the total volume of the nonaqueous solvent.

8. A nonaqueous electrolyte secondary battery according to claim 7,
   wherein the nonaqueous electrolyte further comprises a first salt and a second salt; wherein the first salt comprises LiN(CF$_3$SO$_2$)$_2$ and/or LiN(C$_2$F$_5$SO$_2$)$_2$, and wherein the second salt comprises LiBF$_4$ and/or LiPF$_6$.

9. A nonaqueous electrolyte secondary battery according to claim 1,
   wherein the negative electrode comprises a carbonaceous material whose average layer spacing d$_{002}$, derived from the (002) reflection, is 0.336 nm or less.

10. A nonaqueous electrolyte secondary battery according to claim 1,
    wherein the fifth component comprises phenyl ethylene carbonate, and the ratio of phenyl ethylene carbonate to the total volume of the nonaqueous solvent is in the range of 0.05% by volume to 5% by volume.

11. A nonaqueous electrolyte secondary battery according to claim 10,
    wherein w further satisfies $0 < w \leq 3$.

12. A nonaqueous electrolyte secondary battery according to claim 1,
wherein the fifth component comprises phenyl ethylene carbonate, and the nonaqueous solvent further satisfies the following relationships (12) and (13):

$$0 < s+w \leq 7 \quad (12)$$

$$0.05 < s \leq 5 \quad (13)$$

where, w is the ratio (volume %) of vinylene carbonate to the total volume of the nonaqueous solvent, and s is the ratio (volume %) of phenyl ethylene carbonate to the total volume of the nonaqueous solvent.

13. A nonaqueous electrolyte secondary battery according to claim 12,
wherein the nonaqueous electrolyte further comprises a first salt and a second salt; wherein the first salt comprises $LiN(CF_3SO_2)_2$ and/or $LiN(C_2F_5SO_2)_2$, and the second salt comprises $LiBF_4$ and/or $LiPF_6$.

14. A nonaqueous electrolyte secondary battery according to claim 1,
wherein the fifth component comprises vinyl ethylene carbonate and phenyl ethylene carbonate.

15. A nonaqueous electrolyte comprising:
a nonaqueous solvent; and
an electrolyte which is dissolved in the nonaqueous solvent,
wherein the nonaqueous solvent comprises ethylene carbonate (EC), propylene carbonate (PC), γ-butyrolactone (GBL), vinylene carbonate (VC) and a fifth component that comprises vinyl ethylene carbonate and/or phenyl ethylene carbonate and the nonaqueous solvent satisfies the following relationships (5) to (9):

$$15 \leq x \leq 50 \quad (5)$$

$$30 \leq y \leq 75 \quad (6)$$

$$0 < z \leq 25 \quad (7)$$

$$0 < w \leq 5 \quad (8)$$

$$0 < q \leq 5 \quad (9)$$

where, x is the ratio (volume %) of ethylene carbonate to the total volume of the nonaqueous solvent, y is the ratio (volume %) of propylene carbonate to the total volume of the nonaqueous solvent, z is the ratio (volume %) of γ-butyrolactone to the total volume of the nonaqueous solvent, w is the ratio (volume %) of vinylene carbonate to the total volume of the nonaqueous solvent, and q is the ratio (volume %) of the fifth component to the total volume of the nonaqueous solvent.

16. A nonaqueous electrolyte according to claim 15, wherein y satisfies $35 < y \leq 75$.

17. A nonaqueous electrolyte according to claim 15, wherein z satisfies $1 \leq z \leq 25$.

18. A nonaqueous electrolyte according to claim 15, wherein y satisfies $51 \leq y \leq 75$.

* * * * *